United States Patent
Little

(10) Patent No.: US 6,761,871 B2
(45) Date of Patent: Jul. 13, 2004

(54) MAGNETIC PRODUCTION OF CARBON NANOTUBES AND FILAMENTS

(75) Inventor: Reginald Bernard Little, 1555 Delaney Dr. #1216, Tallahassee, FL (US) 32308

(73) Assignee: Reginald Bernard Little, Tallahassee, FL (US)

( * ) Notice: Subject to any disclaimer, the term of this patent is extended or adjusted under 35 U.S.C. 154(b) by 0 days.

(21) Appl. No.: 09/862,678

(22) Filed: May 22, 2001

(65) Prior Publication Data

US 2002/0192141 A1 Dec. 19, 2002

(51) Int. Cl.[7] .................................................. D01F 9/12
(52) U.S. Cl. ................................. 423/447.3; 423/447.1
(58) Field of Search ........................... 423/447.1, 447.3, 423/445 R, 445 B

(56) References Cited

U.S. PATENT DOCUMENTS

2001/0053344 A1 * 12/2001 Harutyunyan et al. .. 423/445 R

OTHER PUBLICATIONS

Sun, L.F. et al., "Growth of carbon nanofibers array under magnetic force by chemical vapor deposition", Mar. 23, 2001, Chemical Physics Letters 336, pp. 392–396.*

Smith, B.W. et al., "Structural anisotropy of magnetically aligned single wall carbon nanotube films", Jul. 31, 2000, Appl: Phys. Letters vol. 77, No. 5, pp. 663–665.*

Hone, J. et al., "Electrical and thermal transport properties of magnetically aligned single wall carbon nanotube films", Jul. 31, 2000, Appl. Phys. Letters vol. 77, No. 5, pp. 666–668.*

* cited by examiner

*Primary Examiner*—Stuart L. Hendrickson
*Assistant Examiner*—Peter J Lish

(57) ABSTRACT

A catalyzing process under intense external magnetic fields is disclosed that is useful for accelerating carbon nanotube formation. A synthetic scheme is also disclosed. The nanotubes maybe magnetically aligned during the growth and formation and pose many applications.

5 Claims, 19 Drawing Sheets

Decomposing Facet

Graphitizing Facet

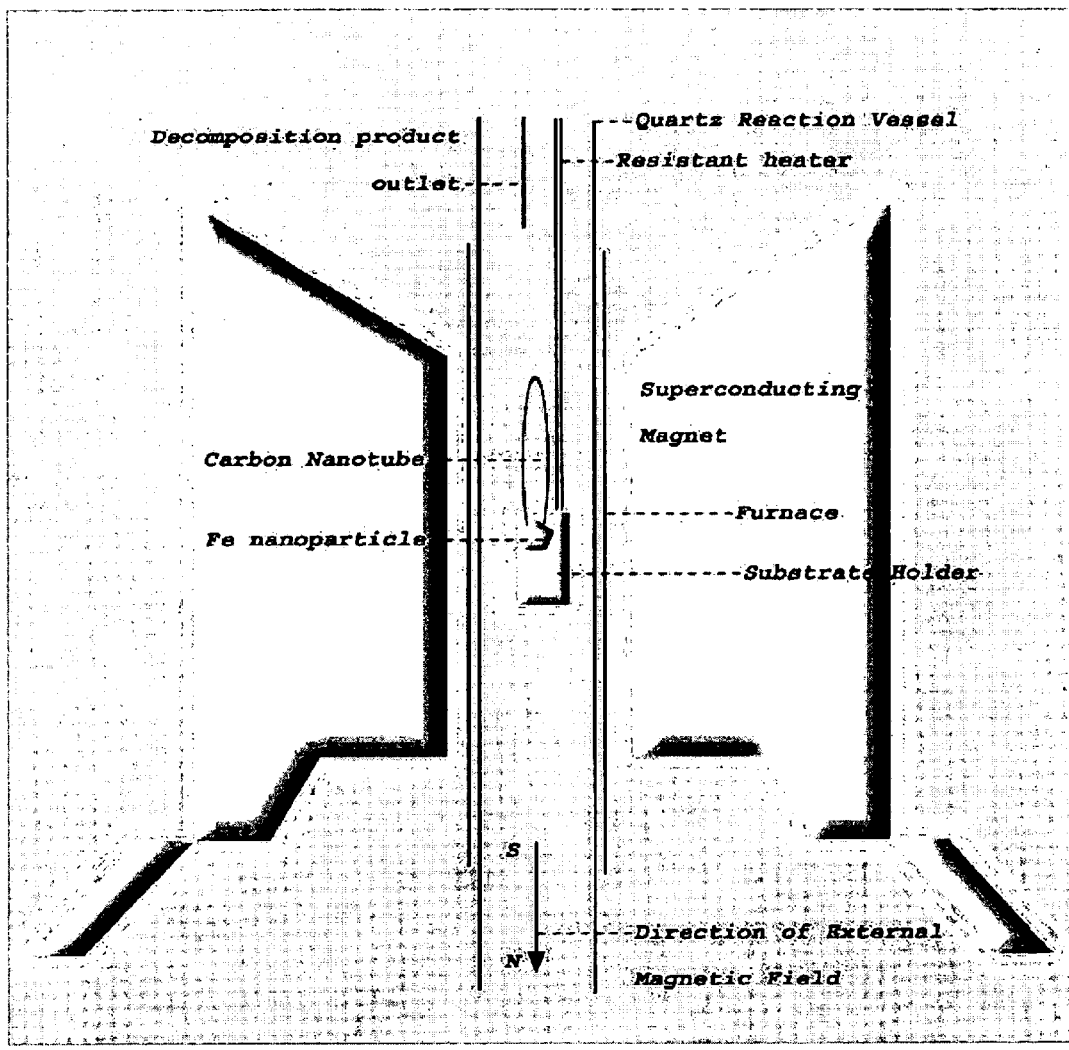
Figure 2 - Magneto Catalytic Chemical Vapor Deposition Reactor

Case A Metal carbide

Case B2 Unstable metal carbides   Global surface graphitization

Case B3 stable metal carbides    Global surface amorphous carbon

Development and elongation of nanotube wall or normal graphene structure

Development of nanotubular dome containing graphene and five member rings

Figure 17 – Magneto Catalytic Chemical Vapor Deposition System

MAGNETIC PRODUCTION OF CARBON NANOTUBES AND FILAMENTS

BACKGROUND OF THE INVENTION

This invention involves the use of intense magnetic fields to accelerate the chemical changes associated with the formation of graphitic nanotubes. This invention pertains to a new process and apparatus for the massive synthesis of carbon nanotubes using strong external magnetic fields to enhance the formation and growth by reinforcing the intrinsic magnetic mechanisms occurring during the formation.

The carbon nanotube is a hollow tube with walls made of graphene and a capping dome containing $C_6$ conjugated aromatic rings and a few $C_5$ member rings to alleviate curvaceous strain on the bonds. Such macromolecules of graphene are known as fullerenes. The carbon nanotube is a fullerene of great importance.

The mass production of carbon nanotubes for diverse applications is currently among the most challenging problems in nanochemistry, potentially revolutionizing many important areas of material science, particularly nanoelectronics and structural materials. The importance of enhanced formation and mass production follows from the rich potential for applications.

For example, the potential applications in nanoelectronics result from the atomic level perfection. Future nanoelectronic materials will require atomic level perfection for optimum device performance. Such a demand is unrealistic for most materials. However, the nanotube is an exception to this impracticality. The nanotubes exhibit intrinsic perfection due to the chemically bonded network, where thermodynamics restricts defect formation. Such perfection in the carbon nanotube allows ideal exploitation of mesoscopic and molecular properties, where atomic defects are intolerable. The perfection allows nice thermal and electrical conductivity in the direction of the tube axis due to the extended electronic resonance. The chemically bonded network also leads to the maximum possible strength among materials. The strength of nanotubes will contribute to many future structural applications. This optimum strength reflects the extremely stable, doubly covalently bonded network. Carbon nanotubes therefore exhibit the largest strength/mass ratio known for fibers. This threshold for maximum strength requires the existence of atomic perfection in these nanotubes.

Because of these and other possibilities, the large scale production of carbon nanotubes is currently being investigated for applications in nano-computers, strong structural support, catalyst support, scan tunneling microscopy tips and hydrogen storage in order to make use of these unique properties. Unfortunately, the large-scale preparation of the carbon nanotubes has been a challenge with no breakthroughs, except for the new approach described here. With all the prospective applications, large-scale production will be necessary to realize these many new applications. First, the older techniques are considered along with problems associated with these techniques. Then the new invention is described with detailed explanations as to how the new art resolves difficulties of the older art.

The carbon nanotube, $C_{60}$, and other fullerenes were initially discovered in the debris of DC arc discharges. Therefore, the earlier preparations of the nanotubes used DC arc discharges with the graphite and the catalytic metal buried within the anode. In this process, the anode is packed with the metal catalyst and a carbon source. The ablation during an intense pulse of electric current produces high temperature and generates plasma, which contains ions and atoms of the eroded anode material. These ions and atoms nucleate the fullerenes. Later strategies used modified arc discharge, which synchronously arched and helium quenched plasma in an effort to increase the formation of graphite encapsulated metal particles and the formation of carbon nanotubes. Laser ablation of the anode was the next effort used to increase production.

In recent years, with the discovery of catalytic chemical vapor deposition (CCVD), the emphasis for mass production has shifted from arc discharge to CCVD techniques. CCVD involves the formation of carbon nanotubes by the catalytic decomposition of hydrocarbons on the surface of Fe, Co, and Ni nanoparticles. The CCVD technique is a continuous process, whereas the arc discharge process is a batch process. The continuous CCVD process is an ideal approach for the industrial synthesis of nanotubes, since CVD allows more strict control of processing conditions and CVD has demonstrated itself to be a useful method for industrial production of many other materials. Although the CCVD effort has increased the production rate, current CCVD methods still do not achieve the desired bulky formation rates.

Unfortunately, past attempts to increase growth rates of nanotubes by CVD have failed due to the poisoning of the catalytic nanoparticles. These attempts involved the older upscaling methods. The older upscaling methods involved changing reactor parameters such as increasing concentration, increasing temperature, and changing catalyst content so as to increase growth rate. These efforts have not been very fruitful for achieving commercial growth rates. Higher hydrocarbon concentrations cause poisoning of the catalyst. Poisoning is the loss of catalytic activity due to carbiding. Carbiding is the formation of metal-carbon chemical bonds on and within the catalytic metal nanoparticle. Supersaturation is the state of the metal nanocatalyst in which the carbon concentration exceeds the equilibrium concentration for carbon precipitation. High concentrations also contribute to multi-walled carbon nanotubes and the accumulation of amorphous carbon along the tube backbone. High growth temperature leads to impractical production cost. The adulteration of the catalyst can introduce impurities into the nanotube and broaden the size distribution. These problems of traditional upscaling arise because the catalytic mechanism of carbon nanotube growth involves novel phenomena alien to the older art.

The following synopsis provides a condensed overall disclosure of references on many of these difficulties associated with trying to apply the traditional art to the carbon nanotube mass production. The current state of understanding of the nanotube formation in terms of the older chemical mechanisms and the history behind developing strategies for addressing these difficulties are disclosed. The current level of technology for nanotube formation and growth is disclosed. Finally, the new revelation from this invention for mass production is presented. The new revelation is considered in details, giving a detailed account of: 1) the new process in comparison to older processes, 2) the new mechanism based upon the intrinsic magnetic field and the consequences of superposing and reinforcing by an external magnetic field and 3) the new design and apparatus. But, first the references are given below:

R. T. K. Baker et al., "Nucleation and Growth of Carbon Deposits from the Nickel Catalyzed Decomposition of Acetylene," Journal of Catalysis vol. 266, pp. 51–62 (1972) discloses the growth of graphite laminae from nickel particles (300 nm diameter) by the catalytic decomposition of acetylene at 1300K. Furthermore, they disclose terminated growth after 15 seconds at 870K upon the accumulation of amorphous carbon about the catalyst. The regeneration is reported after adding $H_2$ at 1100K or $O_2$ at 1000K. The filament formation is accounted for by acetylene adsorption and decomposition at one facet of the catalyst with subsequent internal carbon diffusion to and precipitation at an opposite facet of the particle. The diffusion process is disclosed as temperature and concentration driven.

J. C. Shelton et al., "Equilibrium Segregation of Carbon to Nickel(111) Surface: A Surface Phase Transition," Surface Science vol. 43, pp. 493–520 (1974) discloses the precipitation on the (111) surface of Ni of at least three carbonaceous states: a high temperature dilute carbon phase, a condensed graphitic monolayer and a multilayered epitaxial graphite precipitate.

S. E. Stein and A. Fahr, "High Temperature Stabilities of Hydrocarbon," Journal of Physical Chemistry vol. 89, pp. 3714–3725 (1985) discloses the thermodynamic stability of polyaromatic species relative to saturated hydrocarbons at 1500–3000K and further discloses possible pathways for hydrocarbon decomposition to polyaromatic species.

G. G. Tibbets et al., "An Adsorption-Diffusion Isotherm and Its Application to the Growth of Carbon Filaments on Iron Catalyst Particles," Carbon vol. 25, pp. 367–375 (1987) discloses that the concentration gradient drives the carbon diffusion through the catalyst particle. They further disclose the poisoning by the collision of the catalyst particle with a viscous hydrocarbon particle.

R. T. K. Baker et al., "Catalytic Growth of Carbon Filaments," Carbon vol. 27, pp. 315–323() discloses that the adulteration of the catalyst with Cu leads to an increased rate of nanotube formation with branch nanotube nucleation and growth on a single catalyst particle. The symmetrical branching suggests the carbon filament develop from specific crystallographic planes of the catalyst particle.

Haddon et al., "Experimental and Theoretical Determination of the Magnetic Susceptibility of $C_{60}$ and $C_{70}$," Nature vol. 350, pp. 46(1991) discloses the differing diamagnetic susceptibilities of $C_{60}$, $C_{70}$ and graphite. They disclose that the difference results from the 5 member paramagnetic rings, which counter the ring current of the diamagnetic $C_6$ member ring. This opposing paramagnetic effect of the $C_5$ member ring causes the following relative diamagnetic susceptibility: Graphite>$C_{70}$>$C_{60}$. This decrease reflects the increasing ratio of 5 to 6 member rings.

Schnabel et al., "Evidence of Low Pressure Catalysis in the Gas Phase by a Naked Metal Cluster: The Growth of Benzene Precursors on $Fe_4^+$," Journal of Physical Chemistry vol. 95, pp. 9688–9694(1991) discloses the catalytic capacity for $Fe_4^+$ to form benzene from ethylene and cyclopropane. Hence, the polynuclear aromatics can be formed from hydrocarbons at lower decomposition temperature due to catalysis.

Pan et al., "Reaction of $Co_{1-4}^+$ and $Co_4(CO)_n$ with Cyclohexane: C—H Activation as a Function of Cluster Size and Ligand Substitution," Journal of the American Chemical Society vol. 113, pp. 2406–2411(1991) discloses that the catalytic capacity of Co clusters depends on the cluster size, which reflects the nature of the frontier orbitals. They disclose the increased reactivity of the 3d transition metal clusters as being due to the lower spin in the frontier orbitals, which results in the greater influence of s orbitals. For second and third series transition metals, d orbitals play a stronger role. The accepting ability of the S orbital of the catalyst leads to the conversion of saturated hydrocarbons to polycylic aromatic hydrocarbon (PAH).

Endo and Koto, "Formation of Carbon Nanofibers," Journal of Physical Chemistry," vol. 96, pp. 6941–6944(1992) discloses the existence of giant fullerenes and the growth by the insertion of $sp^2$ carbon in the arc discharge process.

Saito et al., "Topological Defects in Large Fullerenes," Chemical Physics Letters, vol. 195, pp. 537–541(1992) disclose the efficient bond rearranging reactions wherein the motions of five member and seven member ring pairs are demonstrated with subsequent annihilation by collision with a second five member ring.

Rodriquez et al., "A Review of Catalytically Grown Carbon Nanofibers," Journal of Materials Res. Vol. 8, pp. 3233–3250(1993) discloses the preferential decomposition and graphitization on certain facets of the catalyst, discloses the hydrogen and sulfur promotion of catalysis, discloses the absence of carbide and discloses the importance of wetting of metal by graphite precipitate.

Ivanov et al., "The Study of Carbon Nanotubules Produced by Catalytic Methods," Chemical Physics Letters vol. 223, pp. 329–335 (1994) discloses the catalytic chemical vapor deposition of carbon nanotubes with Co as the best catalyst among Co, Fe and Ni catalysts.

Rose and Shore, "Elastic Constants of the Transition Metals from a Uniform Electron Gases," Physical Review B vol. 49 (17) pp. 11566(1994) discloses the trends in bond strength among the transition metals, demonstrating experimentally and computationally the unusual behavior of the ferro-metals.

Guerret-Piecourt et al., "Relation between Metal Electronic Structure and Morphology of Metal Compounds Inside Carbon Nanotubes," Nature vol. 372, pp.761–764 (1994) discloses that the ability to encapsulate transition metals within carbon nanotubes depends on the incompleteness of the electronic shell in the most stable ionic state of the metal.

I. M. Billas et al., "Magnetism from the Atom to the Bulk in Iron, Cobalt and Nickel Clusters," Science vol. 265, pp. 1682–1684(1994) discloses the atomic like magnetic moments of small Fe, Co and Ni clusters containing less than 30 atoms. Moreover, they disclose the oscillating moments in these nanoparticles due to surface induced spin density waves (Friedel waves). Furthermore, Fe clusters exhibit a temperature dependent phase transition between a high moment BCC phase and a low moment FCC phase.

H. Hjiki and T. Ando, "Energy Bands of Carbon Nanotubes in Magnetic Fields," Journal of Physical Society of Japan vol. 65, pp. 505(1995) discloses the splitting of electronic bands of carbon by a magnetic field normal to the tube axis.

Wang et al., "Carbon Nanotube Synthesized in a Hydrogen Arc Discharge," Applied Physics Letters vol. 66, pp. 2430–2432(1995) discloses the formation of opened ended carbon nanotubes in the presence of $H_2$.

Setlur et al., "A Method for Synthesizing Large Quantities of Carbon Nanotubes and Encapsulated Copper Nanowires," Applied Physics Letters, vol. 63, pp. 345–347(1996) discloses the role of $H_2$ in generating polycylic aromatic hydrocarbons during arc discharge and the ability of Cu to graphitize polycylic aromatic hydrocarbons (PAH).

Jia et al., "Preparation and Properties of Ferromagnetic Carbon-Coated Fe, Co and Ni Nanoparticles," Journal of Applied Physics, vol. 80, pp. 103–108 (1996) discloses the interaction between Fe, Co and Ni catalysts and the graphite precipitate with graphitization occurring at 600° C. for Fe and Co. But graphitization occurs at 900° C. for Ni (in comparison to 3000K for °C.).

Chambers et al., "Influence of Copper on the Structural Characteristics of Carbon Nanofibers Produced from the Cobalt-Catalyzed Decomposition of Ethylene," Journal of Materials Res. Vol.11 pp. 430–437 (1996) discloses the ability of Cu in a Co/Cu alloy to enhance the growth rate of smaller nanotubes relative to the rate formed by pure Co. The enhanced formation of the smaller tubes is disclosed as resulting from the facilitation of surface reconstruction by carbide formation allowing multi-faceted particle surface morphology leading to bimodal growth and smaller nanotubes. Cu prevents graphitic overlayer and catalyst poisoning.

Colbert et al., "Growth and Sintering of Fullerenes Nanotubes," Science vol. 266, pp. 1218–1222(1995) discloses a mechanism for nanotube formation in arc discharge where in the absence of catalyst the tube opening is stabilized by the strong electric field of the plasma.

Seraphin et al., "Filling the Carbon Nanocage," Journal of Applied Physics vol.80, pp. 2097–2104(1996) discloses the propensity for graphitic encapsulation of transition metals depends on the existence of its carbide, interfacial interaction and stability with the graphite shell and the processing conditions: 1) weak carbides are encapsulated as carbides, 2) unstable carbides are not encapsulated but form a graphitic cage, 3) stable carbides are not encapsulated, and 4) metastable carbides are not encapsulated but form nanotubes.

Host et al., "Graphite Encapsulated Nanocrystals Produced Using a Low Carbon: Metal Ratio," Journal of Material Res. Vol. 12, pp. 1268–1273(1997) discloses the ability to encapsulate rather than form nanotubes by using high metal/carbon concentrations. The effect of particle size on the structure (high temperature fcc or low temperature phase) is also disclosed.

Kanzow et al., "Laser Assisted Production of Multi-Walled Carbon Nanotubes from Acetylene," Chemical Physics Letters vol. 295, pp. 525–529 (1998) discloses the effect of freezing point depression by carbon on the catalyst and the effect of particle size on nanotube formation (smaller favor) to graphitic encapsulation (larger favor).

Kong et al., "Chemical Vapor Deposition of Methane for Single Walled Carbon Nanotubes," Chemical Physics Letters vol. 292, pp. 567–574(1998) discloses the importance of carbon source ($CH_4$) to favoring single over multi walled nanotubes. This result is related to the effect low carbon concentration on increasing single wall nanotube formation.

Kanzow et al., "Formation Mechanism of Single Walled Carbon Nanotubes on Liquid-Metal Particles," Physical Review B vol. 60, pp. 11180–11186(1999) discloses a nucleation model for carbon nanotube formation wherein the nanotubes nucleate from graphitic sheets parallel to the catalyst. The sheets undergo bending at the high synthesis temperature by coordinated vibrations to form domes, which grow by adding carbon from the catalyst.

Yokomichi et al., "Effects of High Magnetic Field on the Morphology of Carbon Nanotubes and Selective Synthesis of Fullerenes," Applied Physics Letters vol. 74, pp. 1827 (1999) discloses that magnetic fields up to 10T affect curvature of nanotubes and increase the ratio of $C_{70}$ to $C_{60}$.

T. Ando, "Spin-Orbit Interaction in Carbon Nanotubes," Journal of the Physical Society of Japan vol. 69(6), pp. 1757(1999) discloses the use of effective mass Hamiltonian in the presence of a weak spin-orbit interaction in order to demonstrate a spin Zeeman energy due to magnetic field in both the circumference and axial directions.

M. F. Lin, "Magnetic Properties of Chiral Carbon Toroids," Physica B vol. 269, pp. 43–48(1999) discloses the dependence of magnetic properties of chiral carbon toroids reflects the character of π electronic states and discloses that at high magnetic fields the Zeeman effect strongly affects low energy electronic structures, causing drastic diamagnetic to paramagnetic transitions.

Grossman et al. "Transition Metals and their Carbides and Nitrides: Trends in Electronic and Structural Properties," Physical Review B vol. 60, pp. 6343 (1999) discloses the increase in moduli of transition metals with increasing number of electrons for a given principle quantum number, discloses similar moduli for n=3,4 with increase for n=5 and discloses the similarity trends of moduli pure metal and the corresponding metal carbides.

B. W. Smith et al.,"Structural Anisotropy of Magnetically Aligned Single Wall Carbon Nanotube Films," Applied Physics Letters vol. 77(5) pp. 663(2000) discloses the nanotubular alignment occurs using a 25T strong magnetic field; the alignment is such that the axis orients parallel with the external field; and the nanotubular annealing in the strong magnetic field at high temperature.

Van der Wal et al., "Diffusion Flame Synthesis of Single Walled Carbon Nanotubes," Chemical Physics Letters vol.323, pp. 217–223(2000) discloses the importance of $C_2$ species in the molecular path toward soot formation.

Andriotis et al. "Catalytic Action of Ni Atoms in the Formation of Carbon Nanotubes: A Molecular Dynamics Study," Physical Review Letters vol. 85, pp.3193–3196 (2000) discloses the theoretically predicted ability of Ni atoms to stabilize defects along a nanotube backbone until carbon atoms displace the Ni to eliminate the defect. Ni mobility within and without the nanotube and the curvature effects on Ni binding are disclosed.

On the basis of these references, the understanding of the phenomena of carbon formation from hydrocarbon decomposition on metal surfaces has enormously evolved. During the last 25 years, these investigations have determined processing conditions leading to differing phenomena such as graphitic fiber formation, graphitic nanotubular formation, fullerene formation and graphitic encapsulation of metal particle. This progress has resulted in a larger scale selective production of carbon nanotubes with the exclusion of these undesired carbon products. However, currently the nanotubular production rate is not practical for commercialization. Furthermore, the detail mechanism is still unknown. The deficits in the older art result from attempts to understand this complex process by models that are too simple. Previous efforts to increase rates have failed, because new complicating factors are not accounted for by extending the older model to this more complicated system.

On the basis of these previous investigations, the mechanism has been interpreted by the older art consisting of a simpler chemical catalytic model involving: an adsorption of hydrocarbon to a catalytic facet of the catalyst; the decomposition of the hydrocarbon on this facet; the desorption of $H_2$ from this decomposing facet; the diffusion of carbon into and through the catalyst; and finally the precipitation of graphite at some other facet of the crystal. The older art does not recognize the extreme sensitivity of these processes to temperature. The diffusion of carbon within the catalyst has been determined as the rate-limiting step. The carbon diffusion has been attributed to concentration and temperature gradients between the decomposing and graphitizing facets of the catalyst. The diffusion bottleneck to faster nanotube formation results in carbon supersaturation with subsequent carbiding and poisoning of the catalyst. Large temperature fluctuations cause supersaturation and poisoning under high carbon-concentration conditions. Currently during CCVD extended growth is interrupted by sporadic temperature fluctuation and poisoning, shortening growth time and productivity. Hence, efforts to increase reaction and formation rates by classical strategies of increasing the temperature and the concentration gradients have failed. Catalytic deactivation occurs as a result of the supersaturation caused by these older strategies. The supersaturation causes global precipitation with the formation of a carbonaceous overlayer at the catalytic facet. Although promoters such as S, Cu and $H_2$ reduce the poisoning they still do not eliminate the poisoning. In addition to catalytic poisoning, these mass production efforts of the older art have failed due to competing formations of multiwalled nanotubes and amorphous carbon deposits, whereby the system alleviates the supersaturation by nucleating internal tubes and unhybridized amorphous carbon. These limitations of the existing nanotube preparation technology have limited the process to the formation of large quantities of shorter nanotubes with efforts to sinter the tubes to form longer tubes.

BRIEF SUMMARY OF THE INVENTION

I have discovered a new CVD technique to reduce the poisoning, thereby allowing bulky formation of nanotubes. This discovery reduces carbon concentration in the catalyst and increases the carbon diffusion through the catalyst by slowing the carbon production, lowering the activation energy for carbon diffusion, and increasing the driving force for carbon diffusion rather than introducing supersaturating temperature and concentration conditions. This new approach therefore lowers interior and surface carbon concentrations and increases carbon flux, thereby reducing the tendency for supersaturation and poisoning. Furthermore, this new method binds the growing nanotube to the metal nanoparticle for a more extended growth period. This new art of CCVD is based upon my new mechanism. My new mechanism accounts for complicating factors, not included in the traditional upscaling strategies. My new mechanism modifies the previous model by accounting for magnetic effects of the catalyst.

The most efficient catalysts for nanotube formation are all ferromagnetic: Fe, Ni and Co. Paramagnetism is the attraction of a substance to a magnetic field due to unpaired electrons of atoms in the material. However, the atoms of paramagnetic substances do not self-orient. Diamagnetism is the repulsion of a substance by a magnetic field due to the pairing of electrons in the atoms making up the material. Ferromagnetism is a special case of paramagnetism where in the magnetic moment and exchange between atoms lead to the spontaneous orientation in the absence of an external magnetic field. The magnetic forces are usually weaker than the electric forces, so these magnetic effects have been ignored. This reasoning accounts for the exclusion of the magnetic factor by the older art. However, I attribute the unique catalytic abilities of Co, Fe and Ni for nanotubular formation to the large magnetic moments of these metals as nanoparticles. Such large moments produce an intrinsic magnetic field which decelerates decomposition of the hydrocarbon, lowers surface and interior carbon concentration below saturation limit, forces the $H_2$ product away from the surface after the decomposition, pulls the resulting carbon atoms on the surface into the interior of the catalyst particle, increases and directs carbon mobility by lowering activation energy for diffusion, promotes graphitic crystallization at some lateral facet of the catalyst particle, bends the graphene sheet nucleating the nanotube, inhibits multi walled formation relative to single wall nanotubular growth and binds the growing tube to the nanoparticle. The magnetic field also restricts the graphitization to only one facet of the particle. Because of these serious effects of the magnetic field on the mechanism, the magnetic factor cannot be neglected. The new art is based upon a novel magnetic model and incorporates enhancing the phenomena by externally driving the phenomena by applying an external, strong magnetic field.

Based on my new mechanism, the magnetic field is crucial for nanotube formation and growth. Therefore, any effort to substantially increase growth rate must modify the magnetic field. My discovery pertains to using a strong external magnetic field to enhance the individual processes occurring during the formation and growth. Because the carbon diffusion is the rate-limiting step and the magnetic properties of the catalyst accelerate diffusion, this invention focuses upon using an external magnetic field to lower interior carbon concentration and lower the activation energy and increase the directional driving force for carbon mobility beyond the reductions caused by the intrinsic magnetic field. This technique is called MAGNETO CATALYTIC CHEMICAL VAPOR DEPOSITION.

BRIEF DESCRIPTION OF SEVERAL VIEWS OF THE DRAWING(S)

FIG. 1A illustrates the absorption of $CH_4$ (or other hydrocarbon vapor) on a specific facet of the catalyst particle.

FIG. 1B illustrates the preferential decomposition of the hydrocarbon on this particular facet with the desorption of $H_2$ and the absorption of carbon into the particle.

FIG. 1C illustrates the anisotropic diffusion of carbon atoms from the decomposing facet to the graphitizing facet due to temperature, concentration, density, magnetic, spin density and exchange gradients.

FIG. 1D illustrates the graphitization of carbon at a specific graphitizaing facet of the particle relative to the magnetic moment of the particle.

FIG. 1E illustrates the distortion of the graphene sheet at the graphitizing facet under catalytic, thermal, vibrational, electronic and magnetic forces.

FIG. 1F illustrates the nonselective adsorption of hydrocarbon vapor on the nonferromagnetic particle.

FIG. 1G illustrates the nonspecific catalytic decomposition of the hydrocarbon on the surface of the nonferromagnetic particle with the subsequent desorption of $H_2$ and limited absorption of carbon into the nonferromagnetic particle.

FIG. 1H illustrates the limited accumulation of carbon in the nonferromagnetic metal particle.

FIG. 1I illustrates the nonspecific precipitation of carbon at all facets of the nonferromagnetic particle.

FIG. 1J illustrates the nonspecific catalytic graphitization of the precipitated carbon about all facets of the nonferromagnetic particle.

FIG. 2 shows a schematic view of how a chamber may be assembled schematically in the bore of a solenoidal magnet for CCVD. It is important that this chamber may also be equipped with laser vaporization or arc vaporization units.

Figure 10:
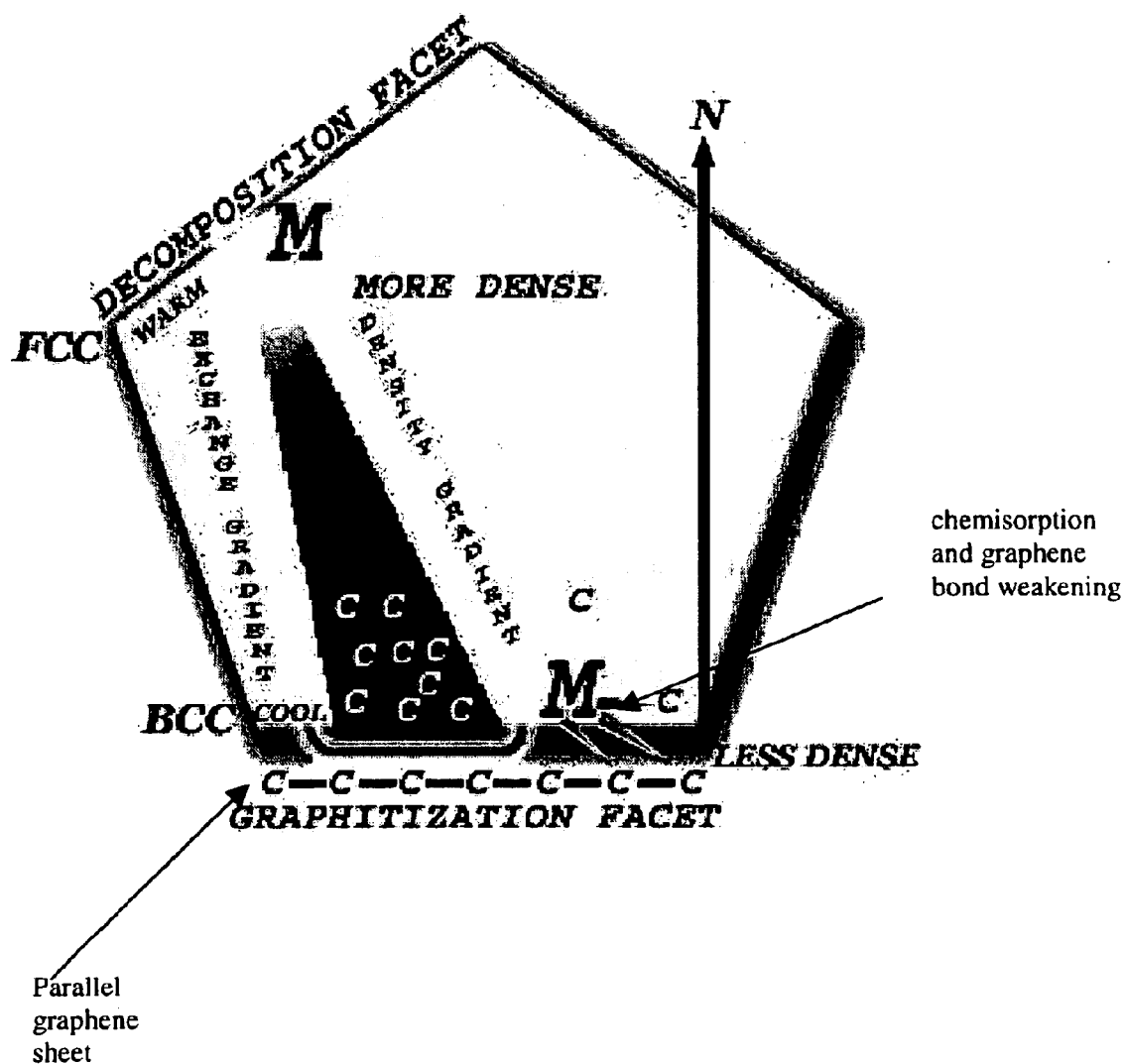

FIG. 10 illustrates the inward growth of a graphene sheet at the graphitizing facet of the particle, whereby the particle surface coordinates the growing graphene sheet and the metal to ligand electron transfer slows the decomposition chemistry at the decomposing site to regulate carbon flux and accumulation toward the graphtizing facet. The magnetic field stabilizes the coordinated charger transfer species due to the high spin.

Figure 11:
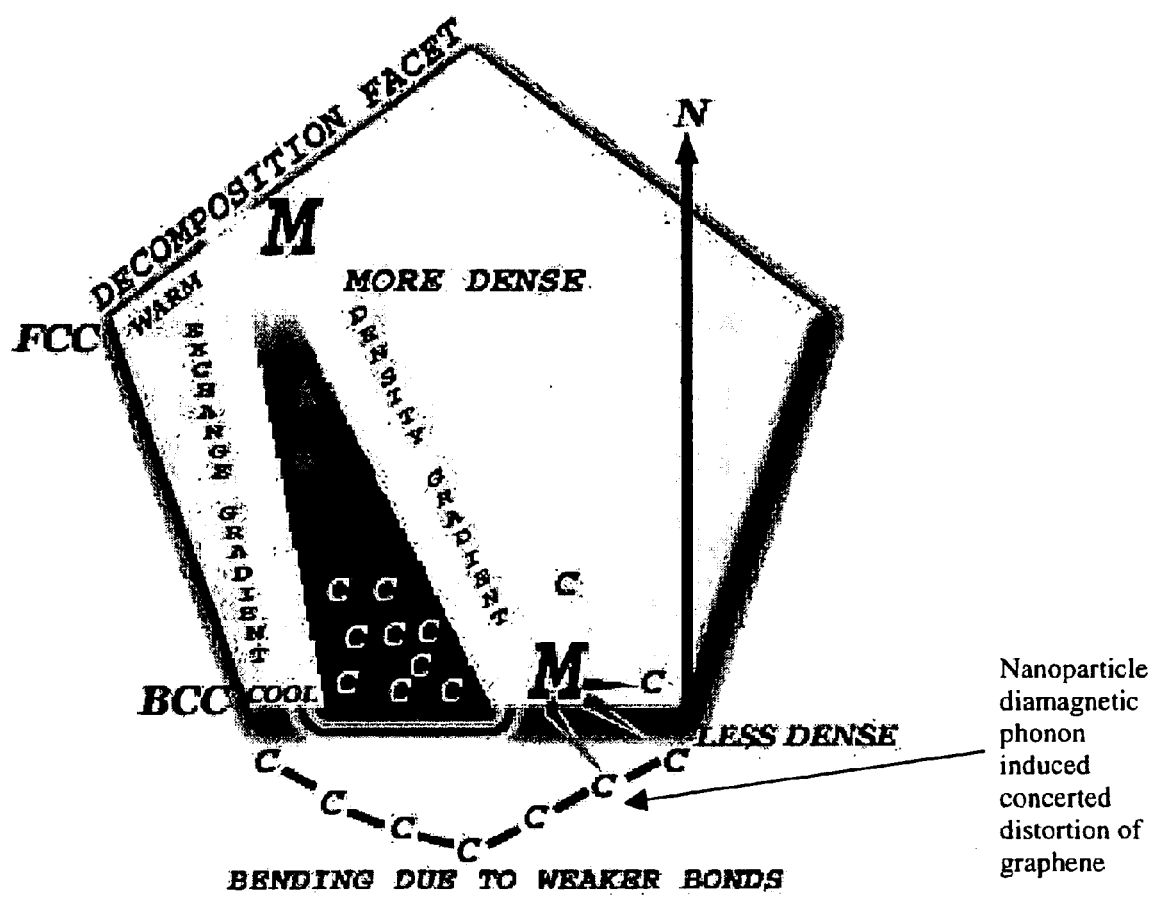

FIG. 11 illustrates the distortion of the coordinated graphene sheet and magnetic fluctuations facilitate the conversion of some diamagnetic $C_6$ rings to paramagnetic $C_5$ rings at the edge (thin bond magnetic effects). The inward motion of $C_5$ by bond switching mechanisms distorts the sheet at the surface nucleating CNT.

Figure 12:
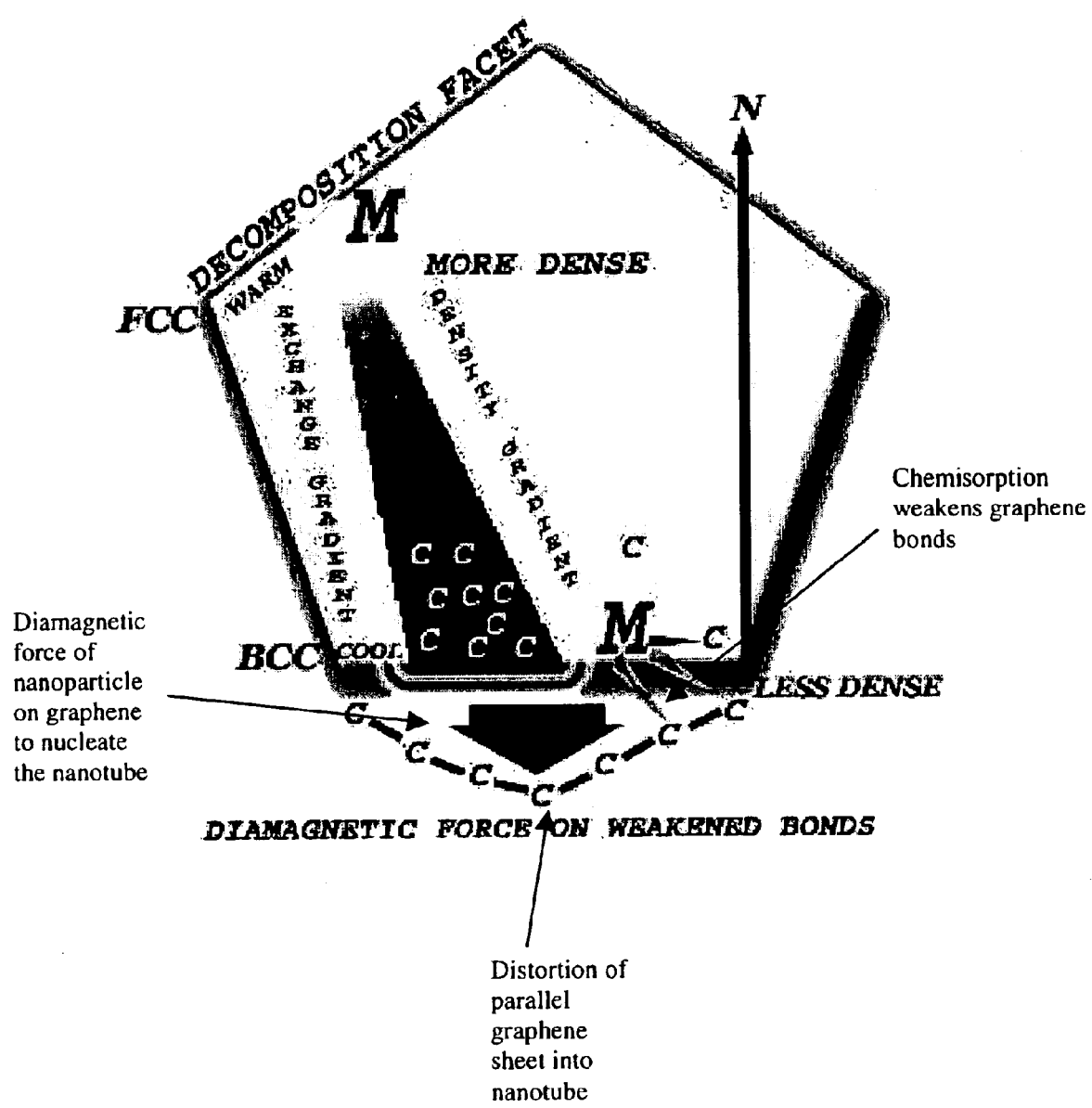

FIG. 12 illustrates the thru space magnetic effect of the magnetic field of the particle repelling the diamagnetic $C_6$ rings in the graphene sheet, contributing another force to nucleate the CNT. The changing magnetic field in the particle facilitates the vibrations of the sheet to nucleate the CNT.

Figure 13:
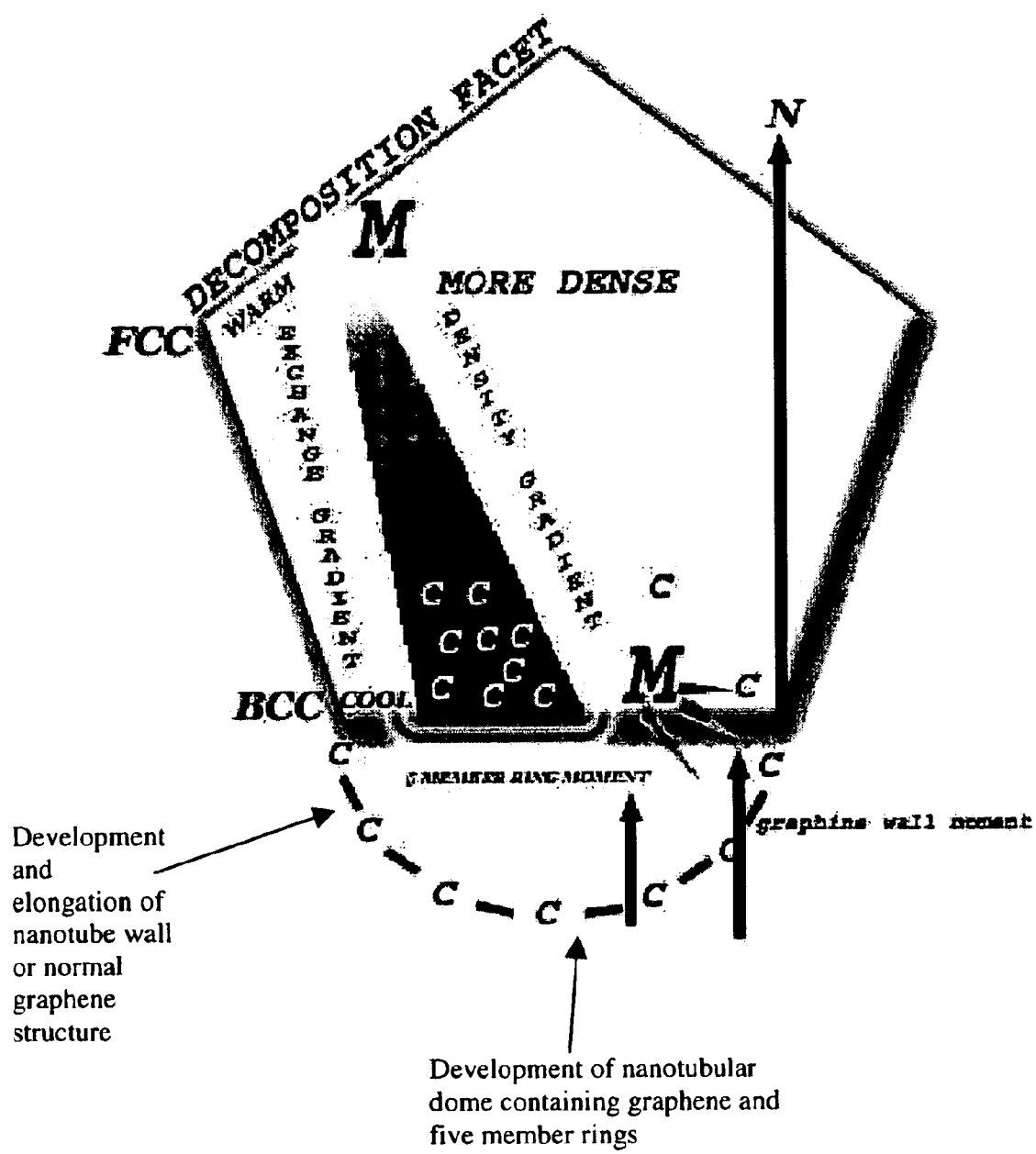

FIG. 13 illustrates the development of $C_6$ rings in the sidewall and elongation of the sidewall in the fluctuating magnetic field of the catalyst. The magnetic field of the graphitizing facet repels diamagnetic $C_6$ rings parallel to the surface (in the initial graphene sheet) but stabilizes $C_6$ rings normal to the surface (in the growing sidewall) after distortion and CNT nucleation.

Figure 14:
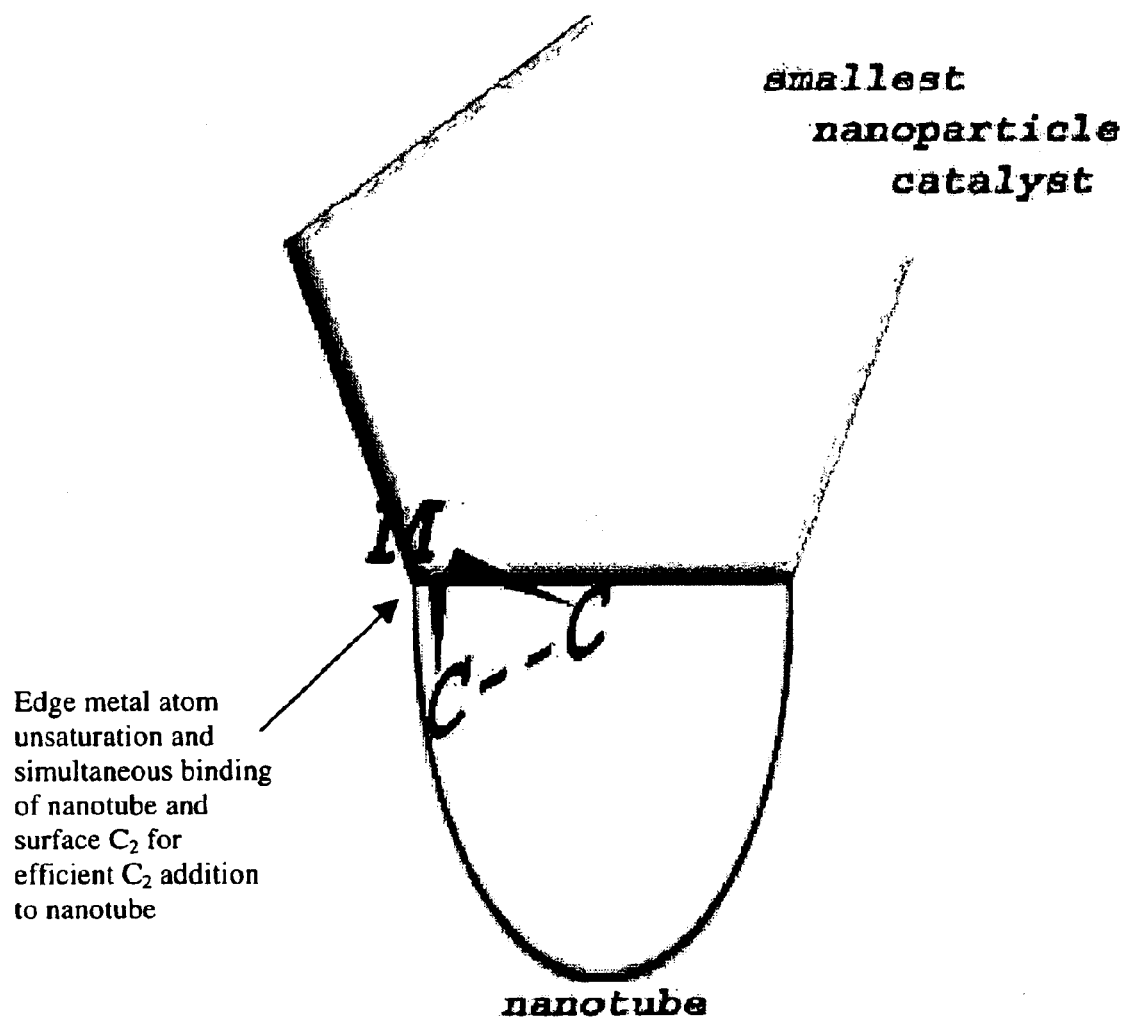

FIG. 14 illustrates size effects of SWCNT nucleation and growth wherein smaller particles the edge atoms are more catalytically active to grow the sidewall and the diffusion length is shorter to the edge atoms to grow the sidewall as opposed to nucleate new inner tubes leading to SWCNT.

Figure 15:
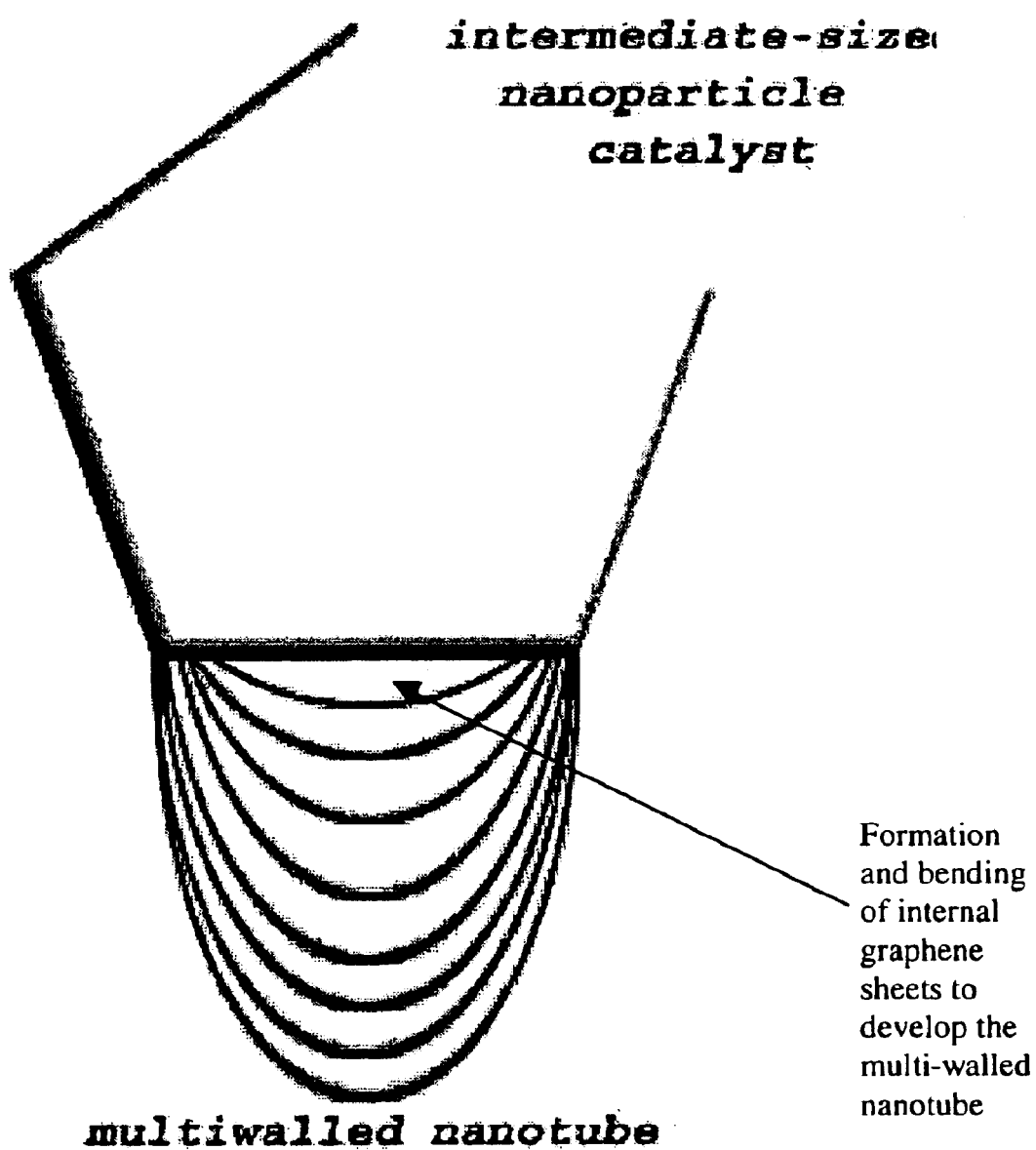

FIG. 15 illustrates the size effect of MWCNT nucleation and growth wherein on larger particles the diffusion length to less active edge atoms is greater so carbon accumulation is more probable (relative to smaller particles) so that inner sheets and tubes also nucleate and grow as the outer tube grows leading to MWCNT development.

Figure 16:
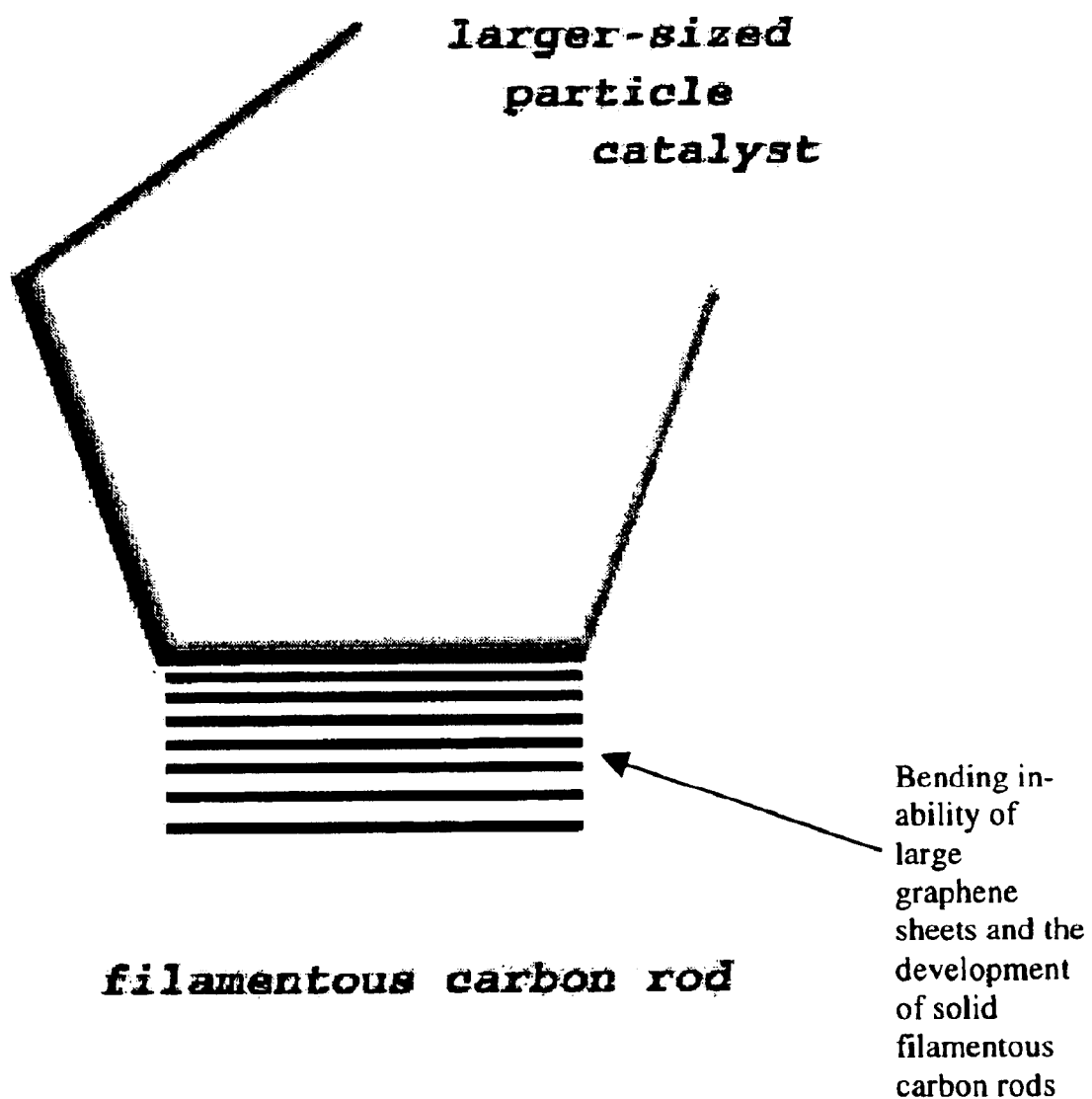

FIG. 16 illustrates the size effect on filamentous formation wherein for really large catalyst particles the diffusion length and sheet size becomes too large for thermal, catalytic, electronic and magnetic effects to force the distortion of graphene layers so layers just stack to form solid graphitic filamentous rods.

Figure 17:
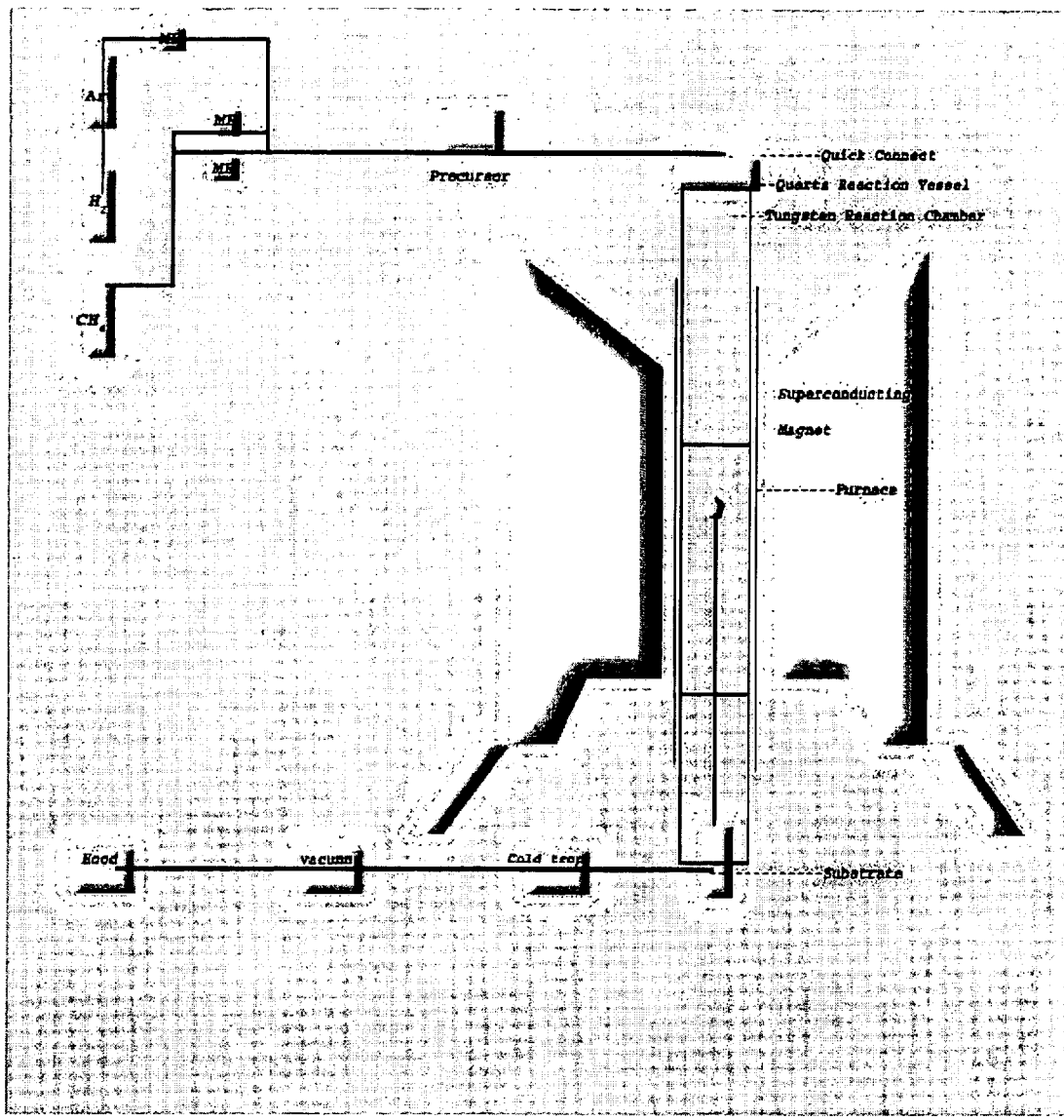

FIG. 17 shows a schematic view of the whole apparatus for the case of CCVD inner chamber, note laser vaporization and arc vaporization systems may easily be exchanged with the CCVD system in the magnet bore (20T).

Figure 18:
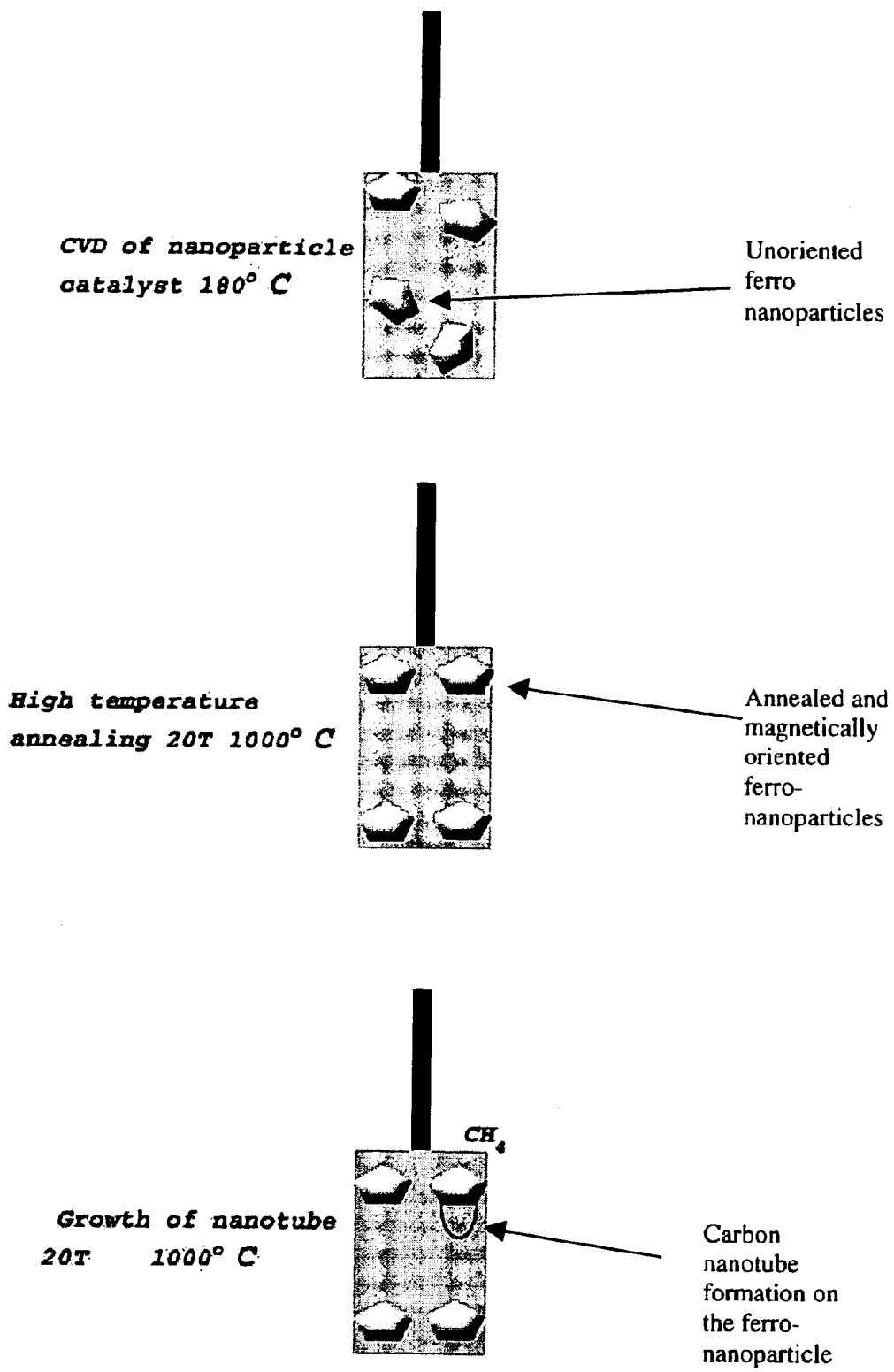

FIG. 18 illustrates the CVD of metal nanoparticles on a substrate in the system, the annealing and orientation of the metal particles and the formation of CNT using $CH_4$ in contact with these catalysts in the magnetic field (20T) at 1000° C.

DETAILED ACCOUNT OF THE INVENTION TECHNIQUES

Although previous investigators have attempted to understand the influence of the external magnetic field on the properties of the nanotube itself, none of these references have considered how the magnetic field affects and determines the intrinsic mechanism associated with the formation and growth of the nanotube. Also, for the one effort wherein a magnetic production was attempted, the previous investigator (Yokomichi et al.) did not effectively applied the external magnetic field to enhance nanotube growth. Moreover, this invention is the first use of external fields to truly reinforce the intrinsic magnetic phenomena. Although Yokomichi et al. used weaker external magnetic fields in the DC arc discharge process, the nature of the arc plasma does not allow the optimum reinforcement of the intrinsic magnetic phenomena. These efforts failed because the plasma arc contains ions of the precursor and catalyst. These ions are accelerated out of the reaction zone by the impressed magnetic field, explaining the lower observed yield of carbon nanotube by Yokomichi et al. In spite of the lower overall nanotube yield, by using the field in the arc discharge Yokomichi et al. did observed a larger ratio of $C_{70}$ to $C_{60}$ among the smaller amount of fullerene products. On the contrary, in this discovery the magnetic field is employed in the CCVD technique. No ions are involved in the CCVD technique so there are no adverse effects of dispersing reactants. Therefore, the effect of the magnetic field in the CCVD process does not reduce but it enhances formation and growth, because the external magnetic field reinforces the intrinsic magnetic phenomena of the catalyst without dispersing the reactants.

Before considering the details of this new mechanism to see why the magnetic field in the CCVD reactor is important for causing massive nanotubular formation, the chemical and physical environments in some different processes are considered and compared. On the basis of this comparison, the superiority of the CCVD techniques for allowing the more effective application of an external reinforcing magnetic field is demonstrated. The processes of consideration include the DC arc discharge, the laser ablation and the CCVD techniques. All these processes create nonequilibrium environments whereby hydrocarbons may be converted to graphene structures.

The DC arc discharge and laser ablation create the nonequilibrium by forming a plasma by the eroding effect of an intense pulse of current or an intense laser beam, respectively, on an anode containing the hydrocarbon and the catalytic metal. The energy of the current or laser beam ionizes atoms of the hydrocarbon and metal, resulting in a plasma with temperature>3000° C. As the plasma cools metal nanoparticles nucleate and carbon species undergo catalytic chemical transformation to form graphite on the metal nanoparticles. The high temperature of the plasma, nature of the nucleated metal nanoparticles, and the electric and magnetic fields in the plasma contribute to the hydrocarbon conversion to graphite. However, it is important to note that this is the first account of the role the intrinsic magnetic field of the metal particle and the magnetic field of the plasma on the nanotubular formation and growth. The nonsteady natures of the arc discharge and the laser ablation techniques lead to the nonsteady influence of these chemical and physical effects. Moreover, the application of an external magnetic field makes the process even more transient as a result of acceleration of ions of the plasma by the applied field. Therefore, the transient magnetic fields in these processes contribute to nanotubular development, but the nature of these techniques does not allow sustained growth under the influence of the intrinsic magnetic field or upon the application of an external field.

The CCVD technique is very different from these plasma-generating techniques. No plasma is formed in the CCVD process. The metal nanoparticles are pre-formed upon a silica substrate. Heating the system to temperatures in excess of 600° C. induces the steady, heterogeneous catalytic conversion of hydrocarbon. Thermal energy is continuously supplied. The catalytic metal particles are stationary and remain within the reaction zone. The hydrocarbon is continuously supplied. The CCVD process is therefore much more continuous and controllable than the arc discharge and laser ablation techniques. The reaction temperature in the CCVD method is much lower and is more easily controlled. The lower reaction temperature in the CCVD process results in a stronger ferromagnetism in the metal nanoparticles and a stronger intrinsic magnetic influence on the nanotube growth. Although the high temperature plasma in the arc discharge has a magnetic field, the field is transient and weaker and the system disperses prior to cooling enough for the effective influence of the nanoparticle's intrinsic magnetic fields. Because no plasma exists in the CCVD method, the application of an external field does not disperse the reactants. Therefore, external field in the CCVD process more effectively reinforces this intrinsic magnetic effect, than the reinforcement possible in the arc discharge or the laser ablation techniques.

DETAILED ACCOUNT OF THE INVENTION MECHANISM

Figures 1A, 1B, 1C, 1D, 1E:
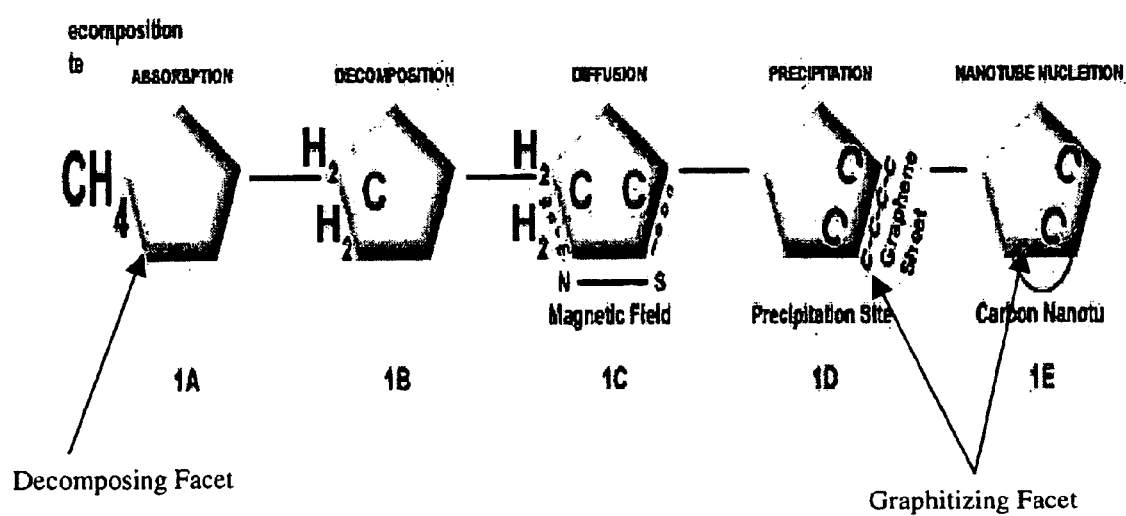
FIGS. 1A–1E show illustrations of the overall mechanism of CNT formation by catalytic chemical vapor deposition (CCVD) on ferromagnetic and some paramagnetic metal particles (Case A metals).
Figures 1F, 1G, 1H, 1I, 1J:
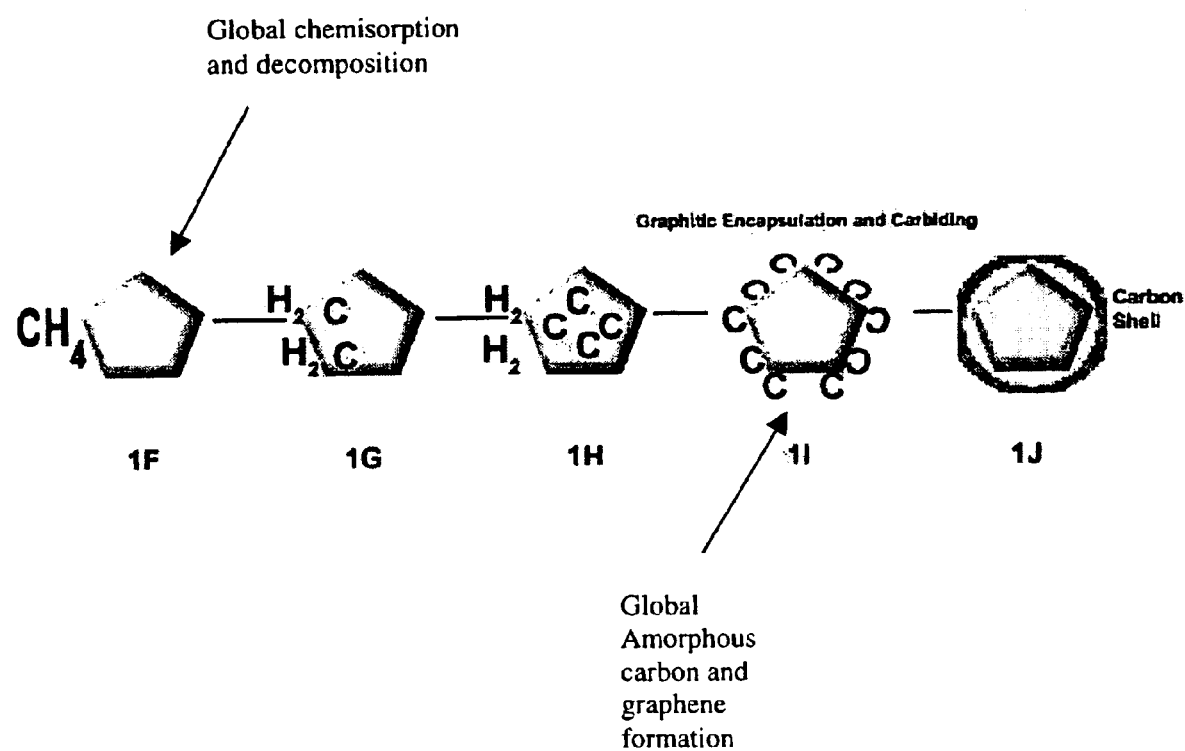
FIG. 1F–1J show an illustration of the overall mechanism for graphitic encapsulation of nonferromagnetic (case B2 and B4) transition metals.

In order to demonstrate the significance of the intrinsic magnetic field and the reinforcing effect of an external magnetic field on the nanotube formation and growth by CCVD, nineteen figures are provided. The intrinsic magnetic effect on growth is illustrated by picturing the phenomena for two classes (ferromagnetic and non-ferromagnetic) of catalyst. FIGS. 1A–1E illustrate the overall mechanism, demonstrating the net influence of the magnetic field upon the formation and growth. In FIGS. 1F–1G, the overall phenomena occurring in nonferromagnetic catalytic systems are illustrated, demonstrating the undesired non-nanotubular products that occur in the absence of the magnetic factor. FIG. 2 illustrates the MAGNETO CATALYTIC CHEMICAL VAPOR DEPOSITION (MCCVD) SYSTEM used for generating the enhanced magnetic conditions conducive to single walled nanotube formation and growth. The other figures illustrate the detailed role of the intrinsic magnetic field of the catalyst on the eight individual steps constituting the overall magneto-catalytic mechanism: 1) hydrocarbon decomposition, 2) carbon solid state diffusion, 3) carbon/metal chemical reactions, 4) graphitization at a lateral facet, 5) electronic weakening of the graphene sheet, 6) diamagnetic graphene distortion and nanotubular nucleation, 7) inhibition of multiwalled nanotubular formation and 8) enhanced growth of the single wall nanotube. The illustrations also reveal how an external reinforcing field enhances these steps contributing to nanotubular formation and growth. The binding of the nanotube to the nanoparticle catalyst is also revealed. The detailed role of the magnetic field on each of these steps in the process is described in order to reveal why and how an externally reinforcing magnetic field accelerates the process.

The following detailed description of the overall mechanism in this invention is organized in terms of a) the effects of the intrinsic magnetic field and b) the enhancing effects of a reinforcing external field upon the following individual steps for the process: 1) hydrocarbon chemisorption and decomposition, 2) $H_2$ desorption and carbon absorption, 3) carbon solid state diffusion, 4) surface and core metal carbide formation, 5) surface graphitization, 6) graphene bond weakening, 7) diamagnetic bending of the weakened graphene sheet, 8) magnetic nanotubular adherence to the metal nanoparticle, and 9) single wall nanotubular stabilization and growth. In order to express the fullness and consistency of the overall mechanism in light of the magnetic field and its exploitation for mass production, the mechanism in the ferrocatalytic system is then compared to some different non-nanotubular mechanisms occurring in three non-ferromagnetic systems.

The logic and reasoning by which the necessity and sufficiency of the magnetic environment for nanotubular formation and growth is reached, involves the consideration and comparison of the dynamics for processes occurring in four different systems consisting of methane and 4 classes of transition metals. These 4 different systems are affected to different extents by the coulombic-chemical and magnetic forces. Therefore, by considering and comparing the 4 systems, the relative importance of these forces (coulombic and magnetic) to the dynamics leading to the different mechanisms is ascertained. Although it is true that the electric force is the origin of the magnetic force based upon the motion of charge, the electronic motion differs in the 4 types of transition metals, causing different magnetic phenomena. The electronic structures and motions in case B metals are such that the systems are nonferromagnetic. The electronic structures and motions in case A metals are such that the systems are ferromagnetic. The logic requires that differences in the dynamics between cases A and B result from ferromagnetic phenomena (differing electronic motion), coulombic effects (differing electronic structures) or both ferro and coulombic differences. In order to eliminate the possibility of electronic structural contributions to the discrepancy, 3 classes of nanoferro transition metals are considered to express the effects of 3 types of electronic structures. Case B3 represents paramagnetic early transition metals with many unfilled d orbitals. Case B4 represents paramagnetic mid 4d and 5d transition metals with many partially filled d orbitals. It is important that case B4 metals are electronically similar to case A metals, but the exchange in case B4 is too weak for ferromagnetism. Case B2 metals represent the paramagnetic late 3d, 4d and 5d transition metals with almost filled d orbitals. The consideration and comparison of these 3 classes of nonferromagnetic transition metals with their differing electronic structures and no ferromagnetism proves the influence of structure on the dynamics associated with the catalytic activity. A close comparison of case A and case B4 then ascertains the importance of ferromagnetism to the dynamics leading to nanotubular formation. It is important to note that this comprehensive, logical comparison is a consideration of experimentally factual data. On the basis of this logical comparison of facts about these 4 systems, the crucial role of ferromagnetism to nanotubular formation and growth is demonstrated.

DECOMPOSITION OF THE HYDROCARBON

The first step of the process involves the hydrocarbon chemisorption and decomposition at a specific facet of the catalyst. See FIG. 3. Chemisorption is the binding of the hydrocarbon to the catalytic surface via chemical bonds. Decomposition is the breaking of chemical bonds of the molecule to form the constituent elements. The chemisorption and decomposition may be interrelated, because the formation of chemical bonds leading to chemisorption may contribute to cleaving C—H bonds.

Although in general the magnetic forces are secondary to the coulombic forces driving chemisorption and decomposition, some metals have magnetic fields, which assist or resist the coulombic push associated with these chemical changes. FIGS. 1A–1E and 3 demonstrate the synergism of the thermal, magnetic and coulombic factors driving the chemisorption and decomposition. The figures also illustrate the influence of the surface on these factors in decomposing the hydrocarbon. In order to further demonstrate the additional role of the magnetic field, to demonstrate the magnetic alteration of the mechanism and to distinguish the effects of coulombic and magnetic forces, two cases (A-ferro and B-nonferro) are considered. The mechanism occurring in case (A) is for a strong ferromagnetic transition metal particle (FIGS. 1A–1E and 3) and the mechanisms in case (B) are for four types of nonferromagnetic metal particles. See FIGS. 1F–1J.

Figure 6:
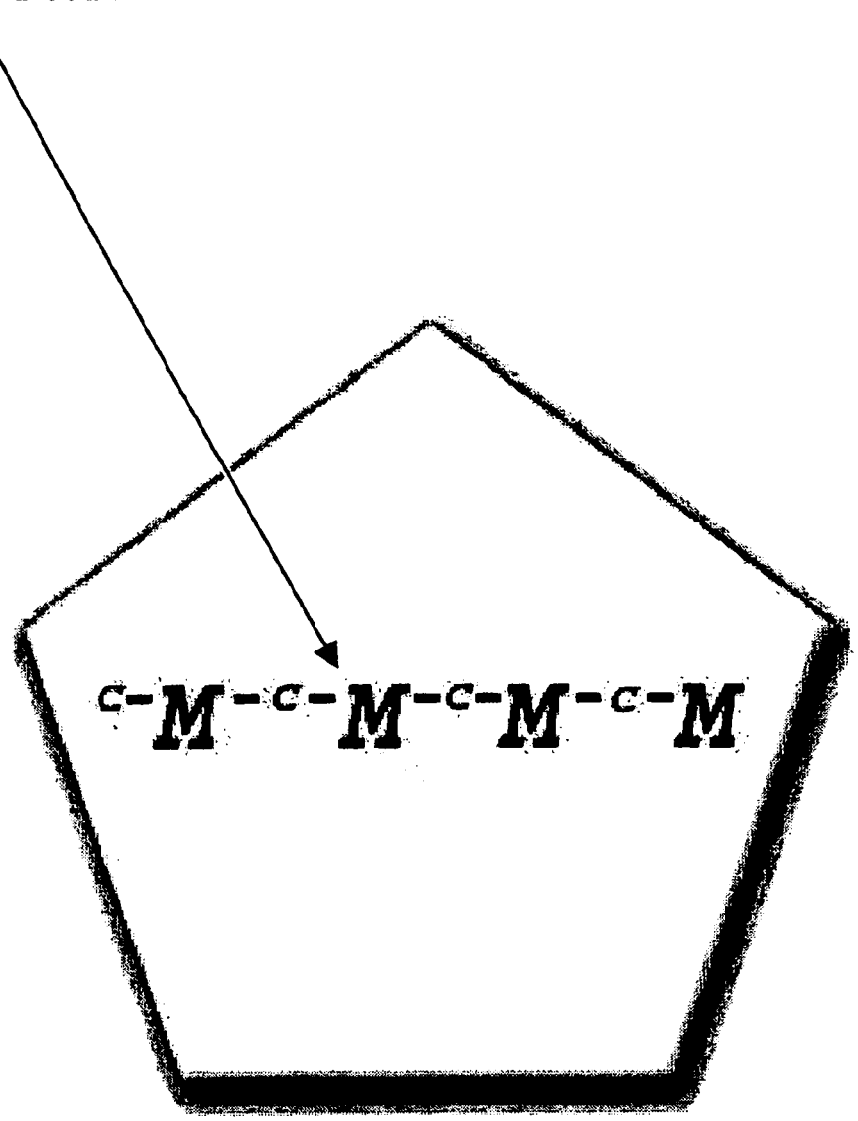
FIG. 6 illustrates possible reversible metal (case A) carbon chemical bond formation during carbon atom diffusion. Reversible carbiding does not poison the catalyst.
Figure 7:
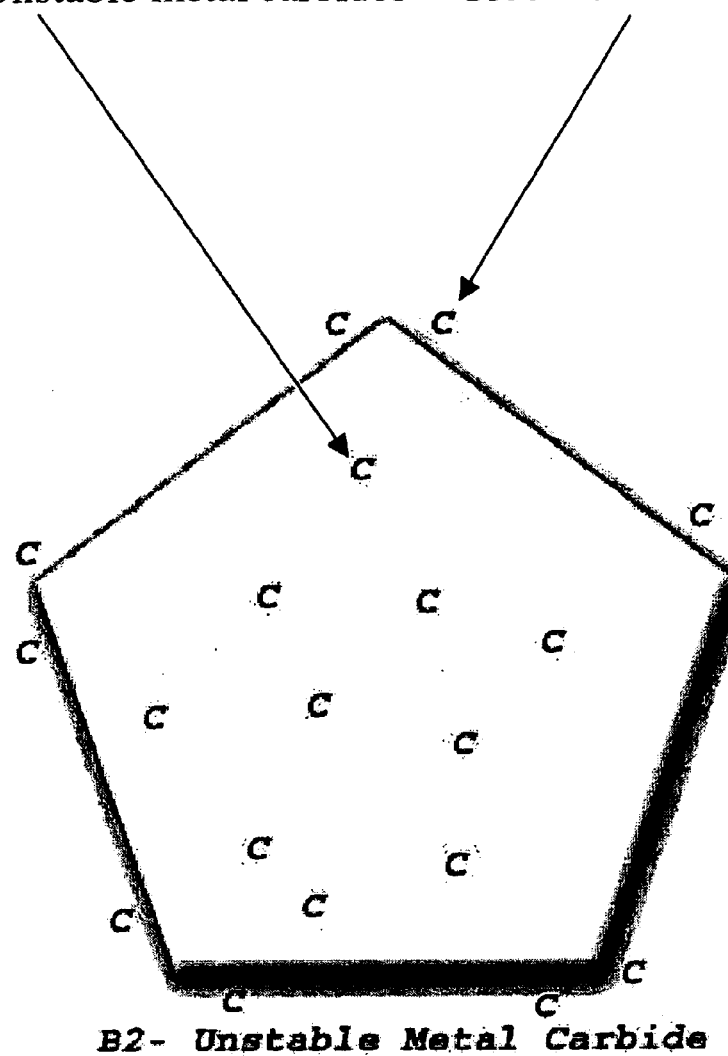
FIG. 7 illustrates possible reversible metal (case B2) carbon bond formation during carbon atom diffusion. Reversible carbiding does not poison the catalyst, but for case B2 carbon eventually precipitates ad graphitizes about all surfaces.
Figure 8:
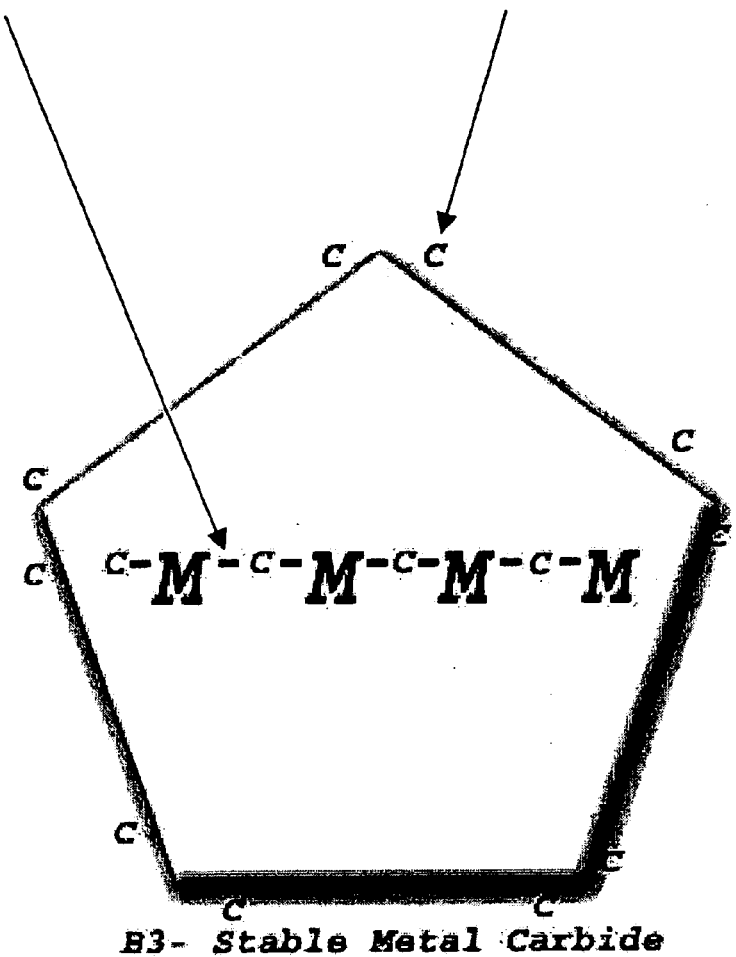
FIG. 8 illustrates possible irreversible metal (Case B3) carbon bond formation during carbon atom diffusion. Irreversible carbiding poisons the catalyst.

Fe, Co and Ni are typical Case A metals (FIGS. 1A–1E and 3). V, Cr, Cu, Zn, Pd, Pt and Ag are typical case B metals. Case B is subdivided into sub-cases B1, B2, B3 and B4. Case B1 consists of some metal carbides ($Co_mC_n$, $Ni_mC_n$ and $Fe_mC_n$, see FIG. 6) of case A metals. Case B2 consists of some late 3d, 4d and 5d transition metals (Zn, Cu, Au and Ag, see FIG. 7). Case B3 consists of some early 3d and 4d transition metals (V, Zr, Nb, Y and Cr, see FIG. 8). Case B4 metals consist of some mid 4d and 5d transition metals (Os, Tc, Ir, Ru, Rh, Pd, and Pt). These 4 classes of metals are considered because they represent systems with varying electronic and magnetic structures such that the different contributions of the electronic and magnetic forces may be expressed.

For both cases A and B, the hydrocarbon chemisorbs and decomposes on a facet of the nanoparticle. In case B, this chemisorption occurs on all surfaces of the particle (Seraphin et al.). See FIGS. 1F, 1I, 7 and 8. However in case A, the decomposition occurs at one facet (Rodriquez et al.), which is likely an FCC weakly magnetic, high temperature surface phase. See FIGS. 1A and 1B. This invention attributes the surface specificity for decomposition to the ferromagnetism of case A systems. The ferromagnetism therefore leads to surface specificity and differences in decomposition between cases A and B.

High temperatures contribute to the chemisorption via the formation of metastable surface metal-carbon bonds. The hydrocarbon decomposition occurs because of its thermodynamic instability relative to multiply bound carbon (fullerenes) at high temperatures (1500–3000 K, characteristic of flame, arc and laser plasmas). The thermodynamic instability follows from the kinetic energy exceeding the potential energy of the C—H single bonds (kinetic control). The d electrons of a catalyst (at this particular facet) weaken the hydrocarbon single bonds by occupying hydrocarbon antibonding orbitals, lowering the activation energy and required temperature (600–1000° C., characteristic of catalytic chemical vapor deposition) for decomposition. The ability of s orbitals to accept electron density contributes to this catalytic effect. Catalysts with the $s^0d^{n+2}$ configurations, therefore, more efficiently cause catalysis (Pan et al.).

Because of the availability of d electrons, most transition metals may therefore catalyze decomposition, but some decompose more efficiently. The late transition metals (cases A and B2) have more d electrons and more easily undergo the $s^2d^n \leftrightarrows s^0d^{n+2}$ electronic transitions. Therefore, electronically, the late transition metals more easily catalyze the hydrocarbon decomposition. These surface effects on the nanoscale enhance these electronic interactions due to the strong catalytic action of edge atoms. The extreme thermal conditions and surface curvature facilitate surface structural changes in the catalyst, which enhance chemisorption and decomposition. The nanosize catalysts therefore allow this decomposition to occur to some extent at lower temperatures in most of the transition metals.

The chemisorption and decomposition are therefore thermally and coulombically driven, hence they occur to different extents for both types (A and B) of catalysts. However, the large intrinsic magnetic field in case A contributes additional phenomena leading to a different mechanism in case A relative to case B. After accounting for thermal and coulombic factors, the large intrinsic magnetic field in case A exerts additional forces on the decomposition process.

The intrinsic magnetic force, involved in case A, counters the coulombic and thermal factors causing chemisorption and decomposition. As already stated, the intrinsic magnetic field restricts the chemisorption and decomposition to a particular facet of the catalyst. This restriction results from the countering effect of the magnetic field on thermal and electronic factors. The magnetic countering results from the stabilization of high spin noncatalytic $s^2d^n$ electronic states relative to the low spin catalyzing $s^0d^{n+2}$ states. This stabilization of the high spin noncatalyzing state is weakest at the decomposition facet. The absence of the magnetic field in case B metals leads to low spin $s^0d^n$ states about the whole surface and to the different global chemisorption and decomposition about the whole particle. The intrinsic magnetic field in case A metals stabilize the noncatalytic high spin state $s^2d^n$ at al of the surfaces except the decomposing surface, limiting and slowing the decomposition at this facet. This invention exaggerates the magnetic slowing and restriction of the hydrocarbon decomposition by increasing the net field externally. The reinforcing magnetic field slows the chemisorption and decomposition even more than the intrinsic effect thereby lowering the carbon absorption, which will be revealed to reduce catalytic poisoning thereby enhancing carbon nanotube formation.

This intrinsic magnetic effect on chemisorption and decomposition is enhanced by the interface. This interfacial effect contributes to nanotubular growth for nanosize catalyst and solid carbon filamentous growth for micron-size catalyst. The discontinuity at the interface causes different physical and chemical environments of surface atoms relative to core atoms. The differing environments lead to coercive differences between surface and core atoms. This coercive difference contributes to spin density gradients and waves from the surface into the interior. Surface atoms have smaller coercivities than core atoms, allowing some surface atoms to have the catalyzing low spin $s^0d^{n+2}$ electronic configuration and thereby causing decomposition.

Figure 3:
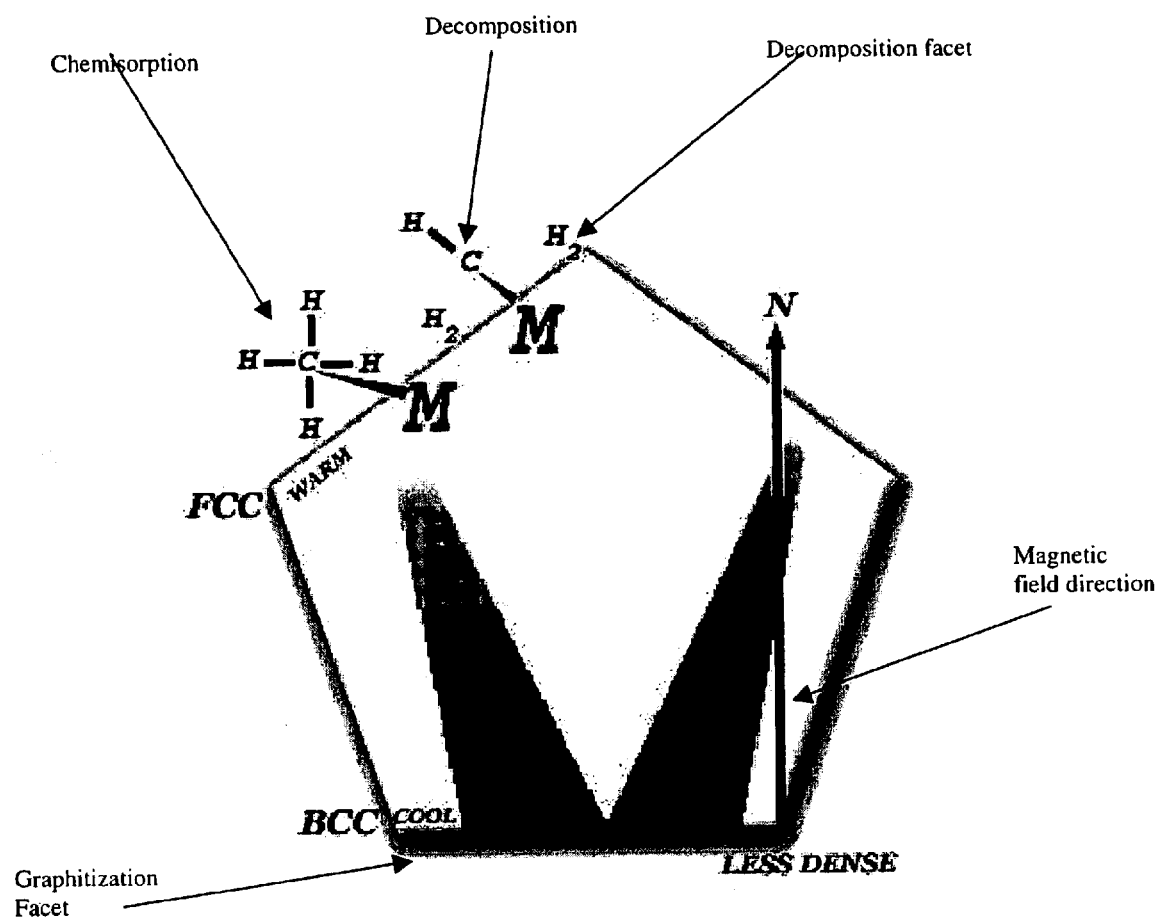
FIG. 3 illustrates the selective chemisorption and decomposition of a hydrocarbon vapor at a specific facet of the ferrocatalyst under thermal, density, magnetic and exchange gradients and anisotropy.
Figure 4:
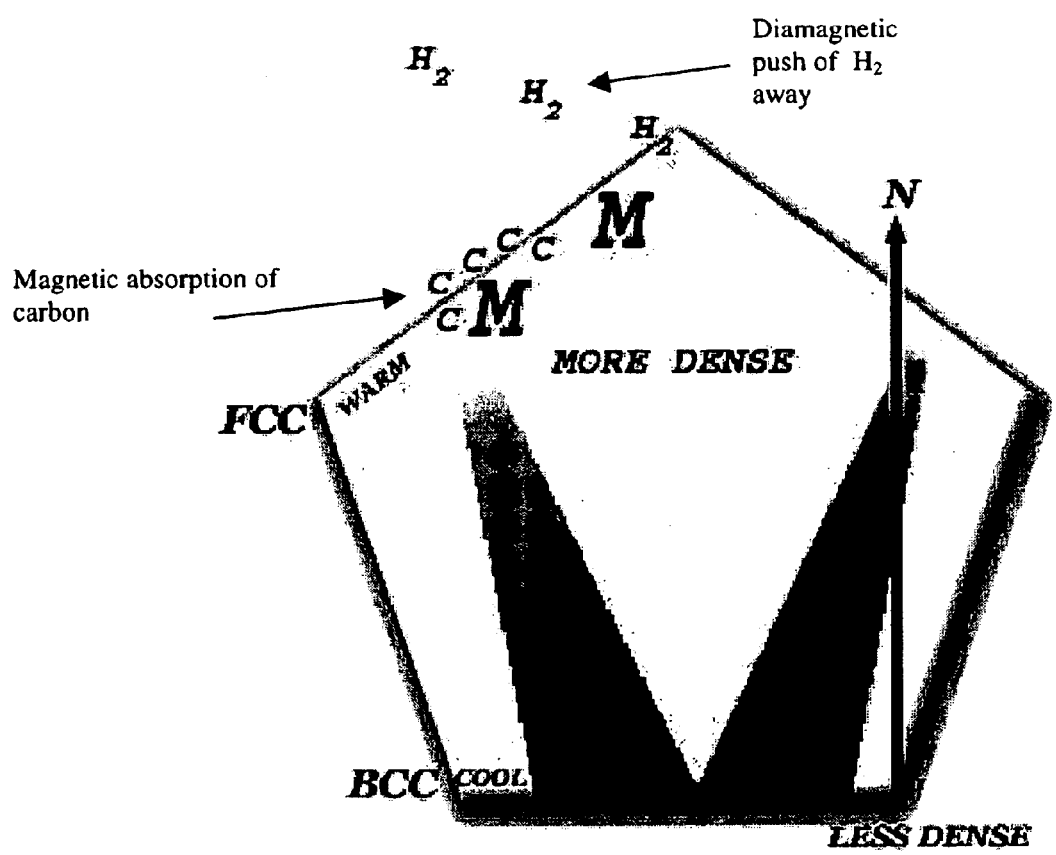
FIG. 4 illustrates the magnetic push of diamagnetic $H_2$ (desorption) away from the catalyst and the paramagnetic absorption of carbon atoms into the interior of the catalyst.
Figure 5:
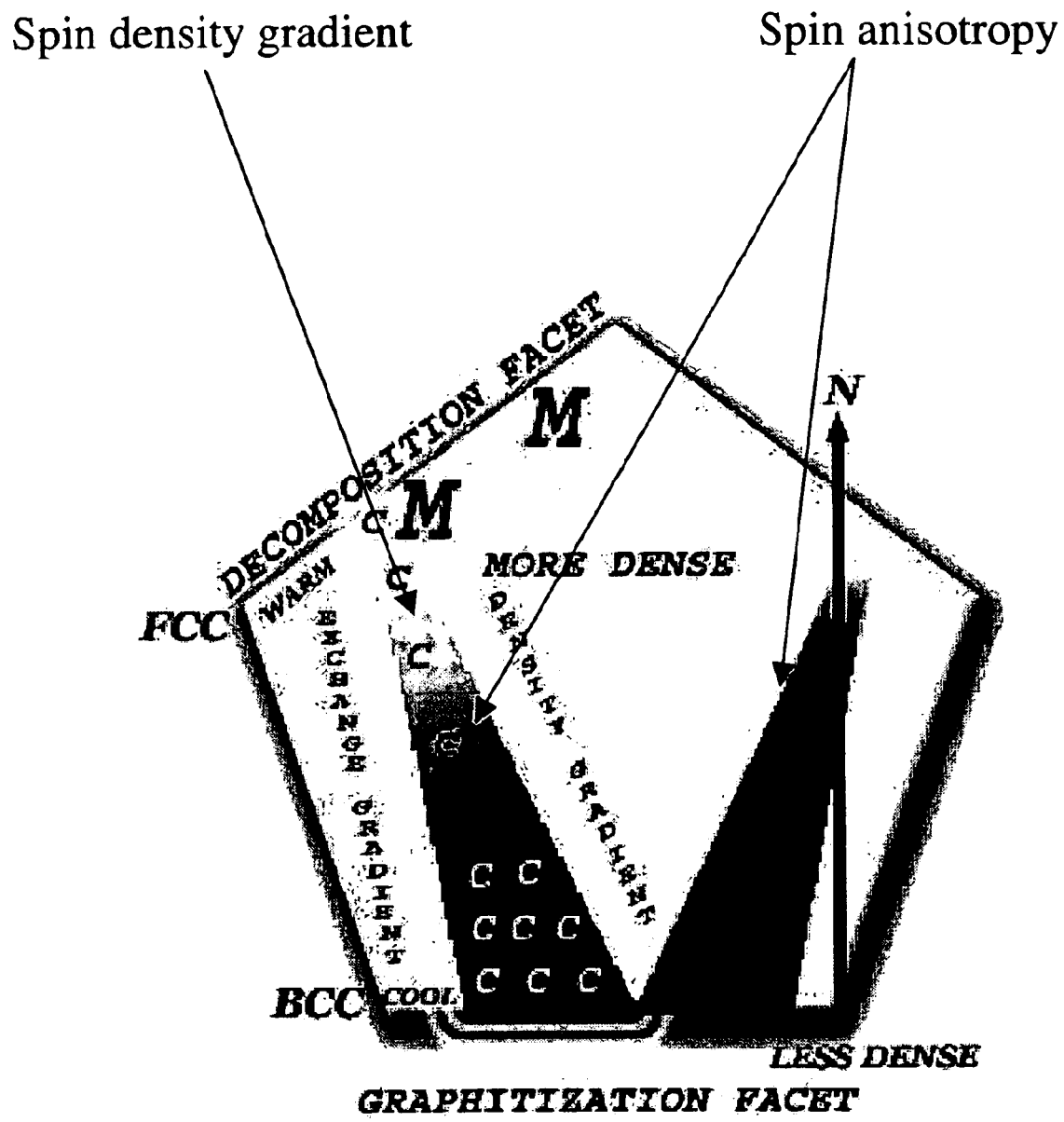
FIG. 5 illustrates the various driving forces (thermal, concentration, density, spin density and magnetic gradients) causing the anisotropic diffusion of carbon atoms from the decomposing site to the graphitizing site.
Figure 9:
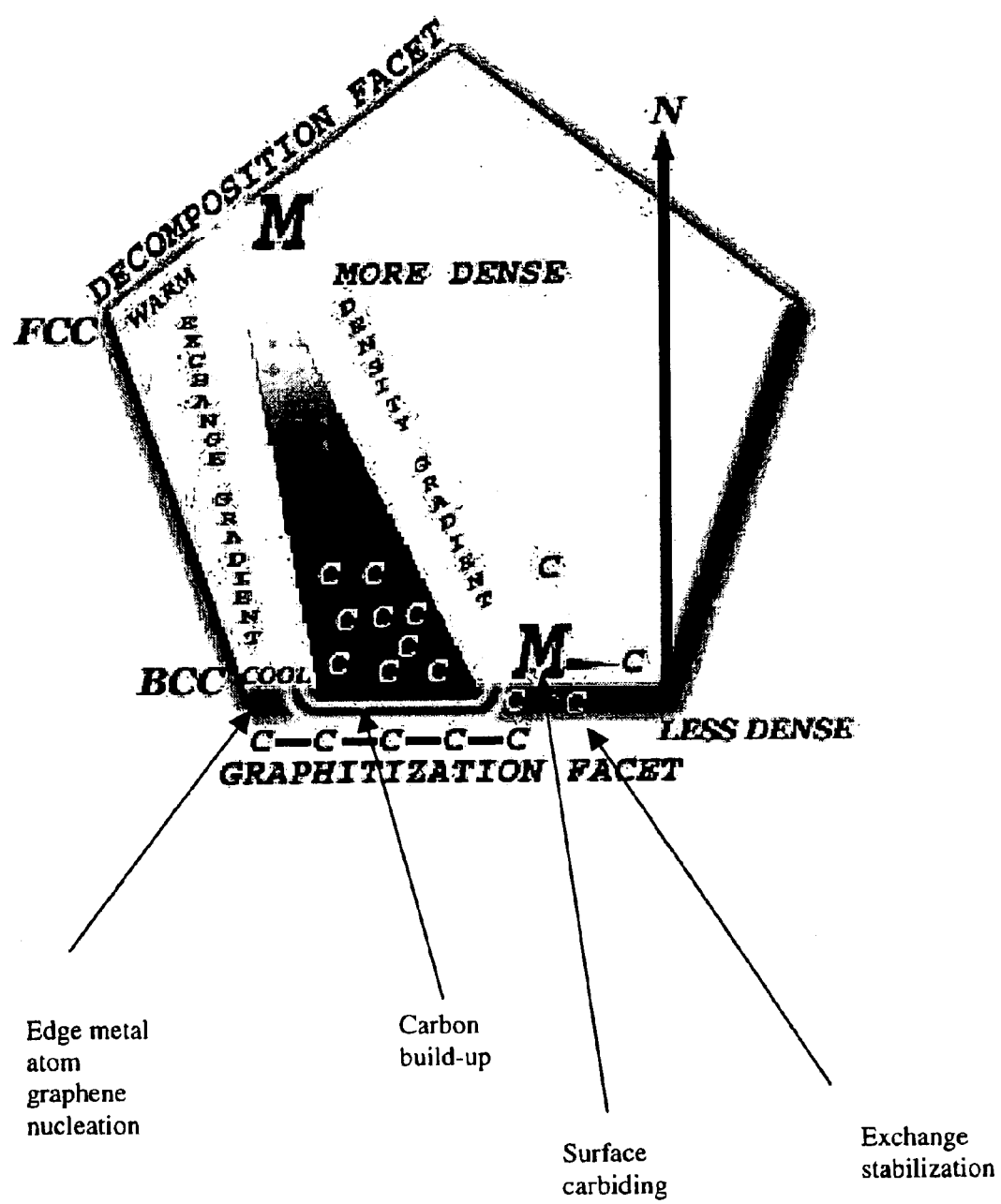
FIG. 9 illustrates the accumulation of carbon at the graphitizing facet of (case A) ferromagnetic catalyst particles in a region of maximum magnetic field with rehybridization of carbon atoms and the coordinated formation of graphene sheets at this location under magnetic, electronic and cooler conditions.

In addition to environmental differences between surface and core atoms of the case A catalyst, the surface atoms of different crystallographic surface planes experience different core environments due to the nonspherical shape of the nanoparticles. These different core environments for surface atoms of different facets produce a diversity of spin density gradients or the anisotropy of the spin density gradients. The extent of anisotropy of the spin gradient depends upon the nanoparticle's shape. These nanoparticles are not spherical, but their shapes exhibit terraces, steps and edges. Moreover, the nanoparticles are oblong. The magnetic field prefers the direction normal to the facet having the smallest total surface area and the smallest atom density. As will be discussed, this facet with smallest surface area corresponds to the BCC graphitizing facet. See FIGS. 1D, 9 and 10. On the other hand, the facet having the largest surface area is the decomposing facet and corresponds to the FCC decomposing facet. See FIGS. 1A, 3 and 4. The magnetic field favors the facet of smallest surface area (BCC) due to the smaller spin density gradient in this direction. In FIGS. 3, 4 and 5, the spin density gradients are given in two directions. The change in darkness expresses the magnitude of the gradient. Large gradients are expressed by larger changes in darkness. The gradient in the direction of the magnetic moment is smaller than the gradient in the direction of the decomposing facet. Although the figures do not illustrate it, the differing gradients reflect the anisotropy due to the nanoparticle's shape. The spin gradient anisotropy causes the surface specificity of the chemisorption and decomposition.

The larger spin density gradient in the direction of the decomposing facet causes in smaller coercivities of the surface atoms of this facet. This smaller coercivity is important because the high spin $s^2d^n$ state is non-catalytic, but the low spin $s^0 d^{n+2}$ electronic configuration is catalytic. The surface atoms in the decomposing facet more easily transform ($s^2d^n \leftrightarrows s^0d^{n+2}$) due to the larger spin gradient in this facet direction. Surface atoms of the decomposing facet dynamically change electronic configuration due to spin density waves and therefore control the carbon production and subsequent absorption. Novel surface-spin phenomena therefore modulate and modify catalytic activity during the decomposition for case A relative to case B metals. This modulation slows carbon generation and absorption for case A relative to case B metals. This spin modulation restricts decomposition to one facet and graphitizing to another facet. This novelty improves the older model by accounting for this important intrinsic surface and shape induced magnetic effect on the hydrocarbon decomposition. This mechanistic novel magnetic aspect involves surface induced spin density waves (Friedel waves), which cause low to high spin transitions of electrons between s and d orbitals of the catalyst ($s^0d^{n+2} \leftrightarrows s^2d^n$). These fluctuating electronic transitions modulate chemisorption and decomposition, effectively controlling carbon flow into the catalyst interior.

These electronic transitions are prominent in nanoparticles because of the large ratio of surface to volume. Surface atoms in case A experience a discontinuity in magnetic (spin) and electronic surroundings. Such a discontinuity produces a gradient. This interfacial effect facilitates for electronic, magnetic and structural rearrangements. These transitions involve high spin body centered cubic (BCC) to low spin face centered cubic (FCC) structural changes. Such structural changes are facilitated due to sufficient thermal energy, because the process occurs near the Curie temperature and the melting point of the catalyst. The Curie temperature is the temperature beyond which the atoms have enough vibrational and rotational energy to overcome the exchange-induced orientation of the spins. Exchange is the delocalized electronic interaction via overlapping atomic orbitals within the solid material. Case A metals are more subject to such structural transitions due to their smaller moduli relative to case B4 metals.

The surface energy facilitates the surface nucleation of new structures and surface reconstruction relative to the core. The structural and spin transitions originate at the surface and spread into the core. As will be discussed, these spin transitions also affect the carbon diffusion, the graphene precipitation, the bending distortion of the graphene sheet to nucleate the nanotube and subsequent magnetic adhesion of the nanotube to the nanoparticle. These phase transitional effects in the nanoparticles arise because of the large fraction of surface atoms and the prominence of the interface. The surface structural transitions and surface spin density waves become more important for smaller catalyst particles. These increasing surface effects in the smaller nanoparticle contribute to nanotube formation as opposed to carbon filament formation in the larger micron catalyst particles.

These considerations of cases A and B demonstrate the intrinsic ferromagnetic effects and nonferromagnetic effects of the catalysts on the decomposition. In this invention, the superposition of the intrinsic magnetic field (case A) with and an intense external magnetic field leads to a greater slowing and restriction of the chemisorption and decomposition reinforcing effects. First, the intense external field reduces the spin density toward the decomposition facet. The weaker spin density waves result in fewer oscillations of the magnetic field and phase transitions. The extremely intense magnetic field favors the BCC phase allowing more space for carbon diffusion. The s to d transitions ($s^0d^{n+2} \leftrightarrows s^2d^n$) occur less under the influence of the reinforcing field due to the stabilization of the high spin, non-catalyzing $s^2d^n$ state. This $s^2d^n$ stabilization slows the hydrocarbon decomposition reactions relative to intrinsic magnetic field of the catalyst. Such slowing of the decomposition reduces surface carbon and interior carbon concentrations. Lower carbon concentrations reduce the supersaturation, metal carbide formation and the poisoning of the catalyst. Kong et al demonstrated the importance of lowering carbon production at the decomposing site. By their comparison of hydrocarbon source on the proclivity to poisoning and on the preferential single wall nanotube formation to multi wall nanotube formation, Kong et al. determine that methane is the best hydrocarbon source. This new art therefore controls the carbon production and flow by using as external magnetic field. The reinforcing magnetic field therefore enhances the single wall nanotube formation by suppressing the poisoning of the catalyst by carbon supersaturation and carbiding, and by suppressing multi-wall formation due to the high carbon accumulation at the graphitizing facet.

After decomposition to form the carbon and $H_2$ products, the intrinsic magnetic field pushes diamagnetic $H_2$ away from the decomposition site. The remaining atomic carbon (C) is paramagnetic and pulled into the ferromagnetic catalytic particle under the influence of the intrinsic surface induced spin density waves. See FIG. 4. The smaller density of the interior BCC (body center cubic) (strongly magnetic) structure relative to the surface FCC (face center cubic) (weaker magnetic) structure facilitates the carbon absorption. This density difference between surface FCC and interior BCC contributes to a bottleneck for carbon absorption and contributes to carbon build-up and poisoning in the decomposition region (Baker et al., 1972). Overcoming this carbon bottleneck is important to the overall process. The intrinsic magnetic field in case A pulls carbon within the particle overcoming the density bottleneck to diffusion. This intrinsic magnetic influence also clears the surface for the chemisorption and decomposition of new hydrocarbon precursor. The intrinsic magnetic field in the ferromagnetic case A, therefore decelerates the rate of formation of carbon and accelerates the absorption of carbon atoms by the catalyst, relative to the absorption and decomposition in the weakly paramagnetic case B. In this invention, the reinforcing external magnetic field enhances these effects of the intrinsic field, resulting in a stronger desorption of $H_2$ and absorption of carbon into the catalyst. The reinforcing field also increases the carbon absorption of B2 and B4 metals.

Solid State Diffusion of Interior Carbon

After carbon formation and dissolution, the strong intrinsic magnetic field in case A enhances carbon mobility within the catalyst. See FIG. 5. The activation barrier for diffusion limits the mobility of the carbon solute in the catalytic solvent. The compression and extension of transition metal (TM) bonds to accommodate the carbon motion cause the activation energy for carbon diffusion. The activation barrier for diffusion correlates with the strength of the metallic bonds. The activation barrier also suppresses carbide formation within the core. High temperatures contribute to surmounting the activation barrier to solid-state diffusion.

The activation barrier to diffusion is a function of the strength of metallic bonds. Case B4 metals have higher activation barriers than case A metals. Case A metals have higher activation barriers than case B2 metals. Case B2 metals have similar activation barriers as case B3 metals. Carbon diffusion is therefore more hindered in the order: B4>A>B2>B3. This trend reflects the order of decreasing metallic bond strength of the catalysts. The decreasing metallic bond strength from B4 to B3 metals follows from the changes in electronic structure reflecting the decreasing electron density in d bands. The decreasing metallic bond strength from B4 to B2 metals follows from the greater electron—electron repulsion with increasing numbers of electrons beyond the middle of the TM series. Grossman et al. and Rose et al. demonstrate the maximization of metallic bond strength near the middle (B4 and A) of the transition series (with the exception of Mn). They demonstrate the following trend in bond strength for transition metal series: 5d>4d>>3d. They demonstrate the difficulty of modeling the 3d mid TM (case A metals), reflecting the unusual nature of these ferrometals relative to the other TM. This current difficulty in electronically modeling case A metals relative to the other TM demonstrates the significance of accounting for exchange and ferromagnetism. These experimental and computational data reveal the following profile of bond strengths: B3<B2<A<B4. Electronically, the weaker metallic bonds in B3 metals allow easier formation of metal carbides during the motion of carbon through these metals. The relative weakness of B3 metal bonds follows from the smaller electron density, binding the metal lattice. B4 metals have the strongest metallic bonds. B4 metals, therefore, more strongly resist carbon diffusion, form unstable metal carbides and do not dissolve carbon very well. Case B2 metals have relatively weak metallic bonds, allowing random carbon diffusion but resisting carbiding. The strength of the B4 metal bonds follows from the optimum attraction of nuclei for electrons relative to the repulsion between electrons. As more electrons are added, the electronic repulsion becomes significant lowering the bond strength. This electronic repulsion results in the weakness of B2 metallic bonds. These electronic effects explain the profile (B3<B4>>B2). Case A metals have similar electronic structures as case B4 metals, so why are case A metallic bonds weaker than case B4 metallic bonds? The ferromagnetism contributes to the weak metal bonds in case A relative to case B. The ferromagnetism of case A further contributes to unusual carbon dissolution, rapid carbon atom diffusion and metastable carbide formation. Electronically, this characteristic of case A metals is anomalous, reflecting the work of Rose and Shore. However as new models and theories develop more effectively account for ferromagnetism, the electronically unusual properties of Case A metals will be more predictable. On the basis of this comparison, the electronic effects cannot account for the differing diffusion phenomena between cases A and B metals.

This unusual nature of case A metals is better understood by considering the magnetic effect on metallic bond strength and carbon motion. The electronic structures of carbon and the case A catalysts lead to paramagnetic solute and ferromagnetic solvent, respectively. These intrinsic magnetic properties of case A metals and elemental carbon contribute to novel diffusive properties of paramagnetic carbon in these ferro-materials. As stated, the activation barrier to diffusion results from the compression and stretching of metallic bonds in order to provide space for the motion of the carbon atom in the lattice. Of these two differing bond strains, the compression energy contributes more to the activation energy than the stretching due to the greater work of shortening chemical bonds, resulting from the stronger electron—electron repulsion. In general, the electronic repulsion increases from case B3 to case A to case B4 to case B2 metals due to the increasing numbers of valence electrons. This increase explains the weak metallic bonds and resistance to carbiding of B2 metals. However, beyond electronic considerations, case A metals are special because of the ferromagnetism of these metals. The intrinsic magnetic moment of these case A metals lowers the effect of bond compression on the activation energy for solid state diffusion. Such lowering of the energy follows from the increased exchange interaction during bond compression, which counters the electronic repulsion to lower the activation energy relative to nonferromagnetic systems. The case A ferromagnetic metals therefore have lower activation energies for diffusion in comparison to cases B2 and B4 metals.

The carbon diffusivity for case A metals also differs from the diffusivity for case B metals due to the exchange gradient. See FIG. 5. Not only does the ferromagnetism lowers the activation energy, the exchange gradient in case A due to spin density waves result in a gradient in the diffusive activation energy. The activation energy is greater toward the decomposing facet and smaller toward the graphitizing facet, reflecting the spin anisotropy profiles. Therefore, the metal lattice is more forgiving of carbon atom motion in the direction from the decomposing site to the graphitizing site. The carbon atom requires less activation energy as they migrate toward the graphitizing facet. These phenomena enhance and direct carbon flow toward the graphitizing facet. Therefore, the interface contributes an activation energy gradient, affecting carbon motion.

In addition to the lower activation energy for case A catalyst, the intrinsic magnetic fields and the accompanying surface and shape induced magnetic anisotropies of case A catalysts provide a magnetic driving force for carbon motion. This driving force in case A metals originates from the intrinsic magnetic exchange between the carbon solute and the metal solvent. This driving force accelerates carbon from the decomposing to the graphitizing facet. The fast and directed carbon mobility in case A metals is therefore a result of exchange-correlation interactions between the ferro-nanocatalytic solvents and the paramagnetic carbon solute. The surface and shape induced exchange gradient (spin density waves) contributes to the directional acceleration of carbon from decomposing to graphitizing regions.

Within the interior of case A catalyst, the exchange forces control the motion of the carbon atoms via exchange coupling of unpaired electrons of say Ni, Co or Fe with unpaired electrons of carbon. Because of the exchange gradient, this force on carbon atoms increases from the surface into the core. This spin gradient forces and directs carbon atoms from the surface into the interior of the catalyst. See FIG. 5. In addition, the shape induced spin anisotropy profile within the ferronano-catalyst contributes an angular acceleration on the carbon atom, forcing the carbon from the decomposing site to the graphitizing site of the ferro-nanocatalyst. See FIG. 5. Therefore, the magnetic field contributes a surface induced (radial) driving force for carbon motion and a shape induced (angular) directing force for carbon motion from the decomposing site to the graphitizing site of the ferro-nanoparticle.

The surface induced radial spin gradient and the inherent shape induced spin anisotropy are tempered by a temperature profile from the decomposing facet to the graphitizing facet. See FIG. 5. This temperature gradient is associated with the exothermic process of hydrocarbon decomposition on the FCC facet and the endothermic graphene precipitation on another contiguous BCC side of the catalyst particle. The temperature gradient also results from a carbon concentration gradient. The higher carbon concentrations near the decomposing site reduce thermal conductivity, contributing to a higher temperature in this region of the catalyst. This temperature gradient contributes to the magnetic gradient, which pulls carbon from the decomposing to the graphitizing facet. Therefore the temperature and concentration profiles modify the spin gradient and anisotropy, contributing to lattice directed carbon motion from the decomposing region to the graphitizing region.

The higher carbon concentrations near the decomposing region also contribute to a freezing point depression, so this region tends to be softer (Kanzow et al., 1998). The combined effects of higher temperatures and softening near the decomposing zone result in the higher density (high temperature) FCC structure near the decomposing site. The lower temperature and solidification near the graphitizing region lead to the (low temperature) BCC structure. An oscillating temperature profile produces a changing FCC to BCC configuration within the interior. Surface effects also induce these interior structural transitions. Because of such structural transitions, the higher density FCC structure near the decomposing site squeezes carbon atoms toward the lower density BCC region near the graphitizing site. See FIG. 5. The oscillating structural transitions cause density fluctuations, pushing carbon atoms from the decomposing site to the graphitizing site. Sterically, the FCC structure inhibits graphitization relative to the BCC structure. So the carbon atoms move under the influence of magnetic, thermal and coulombic forces from the FCC decomposing site to the BCC site, where they form graphene. Therefore, the structural changes within the ferronano-catalyst contribute to the carbon motion from the decomposing to the graphitizing facet.

The combined effects of higher temperature and softening near the decomposition zone also result in disorder and frustration of the spin/orbital alignment. This frustration decreases toward the cooler precipitation zone of the catalyst. See FIG. 5. Furthermore, the temperature induced structural differences changes (FCC⇌BCC) frustrate the exchange interaction. The temperature and concentration gradients therefore cause a greater exchange driving force (and also a lower activation energy for diffusion) near the cooler precipitation site, because the smaller nuclear vibrations do not frustrate the exchange as much and the catalyst is more solid in this zone. The carbon atoms also have more void space in this BCC precipitation region. The carbon atom is attracted to the larger exchange region due to the reduction in its potential energy. The surface temperature and concentration induced exchange force gradient therefore pulls the carbon atoms through the catalyst by effectively reducing the activation energy for motion.

A gradient in the exchange interaction can occur because of the short-range nature of the carbon-metal exchange interaction and the delocalized d orbitals. The delocalized overlapping d orbitals produce ferromagnetism. The short range but intense nature of the exchange mechanism requires significant orbital overlap for ferromagnetism. Such overlap more easily occurs in Fe, Co and Ni. The short-range nature and intensity of the exchange interaction further result in local effects of surrounding perturbation, which may be caused by lattice motion from temperature, structural and density fluctuations. The short range influence of perturbations therefore result in the exchange gradient. See FIG. 5.

The absence of the exchange and magnetic field gradients in case B metals eliminates this exchange driving force and guidance on the carbon atoms, resulting in slower diffusion, resulting in interior carbiding and resulting in global surface precipitation around the whole nanoparticle or graphitic encapsulation. See FIGS. 1f–1J, 6 and 8. The absence of the magnetic effect for low spin and weakly paramagnetic metals does not allow catalytic s to d electronic transitions, spin density waves and the resulting density push by BCC to FCC transitions. These factors for case B lead to carbide formation and/or graphitic encapsulation rather than nanotube formation and growth. Alloying B2 or B4 metals with A metals causes ferromagnetism of B2 or B4 metals and nanotubular formation.

The reinforcing magnetic field introduced in this invention enhances the reduction in activation energy for carbon diffusion and the exchange induced driving force for carbon diffusion through the case A catalysts. The strong external magnetic field also contributes to faster directional carbon diffusion in cases B2 and B4 metals. The better carbon absorption and mobility in cases B2 and B4 due to the external magnetic field lead to conditions that are more conducive to nanotube formation. Such nanotube formation does not occur on B2 and B4 metals in the absence of the external magnetic field.

CHEMICAL REACTIONS OF INTERIOR AND SURFACE CARBON WITH THE METAL LATTICE

The mobility of carbon was demonstrated to depend upon the bond alteration of the metal lattice. This bond alteration requires different energies for case A, B2, B3 and B4 metals, resulting in the differing carbon mobility in these metals. The alleviation of the metallic bond stress, associated with providing the necessary space for carbon motion, for case A metals was attributed to the intrinsic magnetic field. In addition to the magnetic alleviation, electronic or chemical interactions between the moving carbon and the metal lattice provide relief to stretched and compressed metallic bonds. Furthermore, This document has demonstrated the importance of surface metal and carbon chemical reactions to hydrocarbon decomposition. Subsequently, it will be demonstrated that surface metal and carbon chemical reactions are also crucial for graphene sheet formation, distortion and growth into the nanotube. The reversible, metastable chemical reactions between the mobile carbon and the metal lattice are therefore significant to the nanotubular formation process. Therefore, next the chemical state of carbon is considered in the different types of metallic catalytic particles.

The chemical significance is revealed by considering and comparing the chemical states of carbon in the different environments within the nanoparticles. The various types of catalysts (cases A, B2, B3 and B4) give these differing environments. In case A, carbon is dissolved to form a carbon/metal alloy. See FIGS. 4 and 5. Carbon is thus a solute of the metal and capable of motion through the metallic solvent. In cases B1(FIG. 6) and B3(FIG. 8), carbon is chemically bound to the metal to form metal carbides. For these systems, carbon becomes stationary and apart of the metal lattice. In case B2, the carbon is also dissolved and mobile within the solvent, but the motion is slower than the motion in case A. In case B4 metals (FIG. 7), the carbon is also dissolved. But, the carbon dissolution and motion in B4 metals are much less and more difficult than that in case A metals.

These various chemical states of carbon in the different classes of transition metals (TM) reflect the various electronic and structural properties of these metals. The electronic and structural properties of TM and their respective carbides have been studied experimentally and theoretically (Grossman et al., and Rose et al.). On the basis of these studies, the TM and their carbides exhibit periodic trends in their properties (hardness and lattice constant) due to periodic electronic structures. In particular, the moduli and strengths of the pure metals have maxima about mid-way of the 3d, 4d and 5d series. The moduli of the corresponding carbides exhibit similar trends as the moduli of the pure metals. These trends in metallic and metal carbide moduli reflect the increasing number of electrons in the bonding orbitals until the mid-point of the series, where additional electrons begin occupying anti-bonding states. Larger numbers of bonding electrons increase the moduli and the larger numbers of antibonding electrons decrease the moduli. The onset of antibonding begins near the middle of the series, so moduli maximize near the middle. In addition to the electron lattice attraction, electron—electron repulsion also contributes to these trends in the moduli across the 3 TM periods. An increase in the directional nature of the metallic bonds across the series also contributes to the trends in moduli. The electrons in the early transition metals behave more like free electron gases. The electrons of the late TM behave less like free electron gases, being more localized in interstitial bonds and contributing to stronger binding of the lattice and greater exchange. The mid TM have more directional bonds than the early TM, but less than the late TM, which tends to give the mid TM intermediate moduli. However, the higher bond order of the mid TM overwhelms this bond directionality to give the mid TM (case B4) larger moduli.

The same arguments given for the trends for the pure metal moduli apply to the trends for the corresponding metal carbide moduli. Grossman et al demonstrated these correlations between pure metals and corresponding metal carbides. Although binding of the metal atoms with carbon leads to similar trends in moduli, the variation in moduli of different metal carbides is not as large. This reduction in the range of the metals carbide moduli is a bond directional effect caused by the carbon. By introducing carbon, the bonds become more directional. This increase in bond directionality is greatest for early TM, raising their metal carbide moduli relative to the mid and late TM carbide moduli. Therefore, the carbiding reduces the differences in moduli between the early (case B3), mid (case B4) and late (case B2) TM.

In addition to this trend across a series (for a given principle quantum number), The columnar trends in moduli reflect the isoelectronic structure, the change in atomic number, the change in atomic size and the effect of the intervening 4f subshell (or the 5d TM). The sum of these effects results computationally in the similarity of the moduli of early 3d and 4d TM. However experimentally, the moduli of 3d metals have been observed smaller than the moduli of 4d metals. This discrepancy between theory and experiment reflects the theoretical deficit in accounting for exchange effects in ferro-metals. Moreover, this discrepancy clearly expresses the nonnegligible influence of exchange and ferromagnetism on the properties of Fe, Co and Ni. Such experimental and theoretical discrepancy is not observed for 4d and 5d TM.

The 5d TM have larger moduli than the 3d and 4d as a result of the larger nuclear charge from the intervening 4f subshell. A comparison of moduli of the mid and late isoelectronic TM is complicated due to the ferro magnetism of the mid and late 3d TM. The moduli of mid and late 3d TM are less than the moduli of corresponding isoelectronic 4d and 5d TM. The mid and late 5d TM have larger moduli than the corresponding isoelectronic 4d TM, reflecting the intervening 4f subshell. Therefore the mid and late 3d TM electronically exhibit unusual moduli.

As was the case for the TM of a given series, the trends for the carbides of isoelectronic TM correlate with the trends for corresponding isoelectronic pure metals. Furthermore, the effects of bond directionality on moduli for isoelectronic TM carbides of a particular column decrease from 3d to 4d (due to the larger atomic size) but increase from 4d to 5d (due to the similar atomic size but larger nuclear charge, lanthanide contraction). The 3d TM and metal carbides tend to exhibit more bond directionality followed by the 5d TM and TM-carbides, and then follow the 4d TM and their carbides. Moreover, the carbiding maintains the trends but reduces the variation in moduli within the trends. Therefore the change in moduli from case B3 to case A to case B2 to case B4 is in general: B4>A>B2>B3.

A similar trend describes the metal carbide moduli: B4>A>B2>B3. The carbides typically have stronger bonds than the metal bonds. However, the difference in moduli among the carbides is less than the difference in moduli among the pure metals. Also, the difference in moduli of a metal and its corresponding carbide decreases in the order: B3>A>B4>B2. It is this difference (metal modulus—metal carbide modulus) in bond strength (moderated by temperature) that determines the state of the carbon in the different metals. The larger difference in bond strengths of B3 metals and their corresponding B3 metal carbides ($B_{carbide}-B_{metal}$) in comparison to the difference for B4 metals and their corresponding B4 carbides results in different tendencies of the two types of metals to react with carbon. The larger change in bond enthalpy for case B3 metals to form their carbides causes a greater proclivity for carbiding relative to the B4 metals. The difference in metal and metal carbide moduli for B2 metals is even smaller than that for B4, making unbound B2 metals somewhat existent under the growth conditions.

Therefore, the larger differences in moduli (metallic instability) for case B3 metals and their carbides result in greater tendency (metallic lability) of these metals to react with carbon to form the metal carbide. On the other hand, the smaller differences (metallic instability) in case B4 results in the smaller tendency (metallic inertness) of B4 metals to react with carbon to form the B4 metal carbides. The four classes of catalytic systems may be kinetically and thermodynamically described at the reaction conditions for CCVD. The B3 metals are therefore labile and unstable. The B3 metal carbides are inert and stable. The B4 metals are labile and unstable. The B4 metal carbides are labile and metastable. Similarly B2 metals are labile and unstable. The B2 metal carbides are labile and metastable. Case A metals are labile and unstable. Case A metal carbides are labile and metastable.

Thermodynamically, the terms stable, metastable and unstable reflect the relative Helmholtz free energies of the metals relative to their carbides. The larger moduli of the metal carbides relative to the pure metal reveal the smaller Helmholtz energy of the metal carbide. The stable carbides have large positive $\Delta H = H_{metal} - H_{carbide}$. The unstable carbides have negative $\Delta$. The metastable carbides (of A, B2, and B4 metals) have small positive $\Delta H$. On the other hand, the stable metals have large negative $\Delta H$. The unstable metals (B3, B4, B2, A) have large positive $\Delta H$. The metastable metals have small negative $\Delta H$. All of the metals considered here are unstable. They are all unstable relative to carbiding. However the low carbon concentration, surface tension and high temperature contribute to the increase stability of the A, B2 and B4 metals in these systems. So that at low concentration and high temperature, the unbound metals exist in the presence of carbon.

The existence of the unstable species and the nonexistence of the stable species involve thermal effects and kinetics. This thermodynamic infeasibility results from kinetic control. Under kinetic controlling conditions the system has enough kinetic energy to surmount activation barriers and exist in higher potential states. The operating temperature and catalytic ability of cases A, B2 and B4 metals result in kinetic controlling conditions for this CCVD process for growing carbon nanotubes. The operating conditions for B3 metals are thermodynamically controlled. The B3 systems do not have enough kinetic energy to overcome the strong binding of carbon by B3 metals. The kinetic control and metastability for cases A, B2 and B4 result in chemical dynamics that are capable of reversibly dissolving, carbiding and transporting carbon, in order to form surface graphene. However, the activating energies and metastability for case A metals are such that these ferro-metals dissolve, reversibly carbide and transport carbon much more efficiently than cases B2 and B4. The better carbon handling of case A metals is a result of the ferromagnetism. As will be discussed, the ferromagnetism also causes the distortion of surface graphene into nanotubes on case A metals. Cases B2 and B4 metals globally generate surface graphene, but without intrinsic ferromagnetism they are not able to distort the graphene into nanotubes.

Therefore, thermodynamically, carbon is therefore stable in case B3 metals as B3 metal carbides and metastable in cases A, B2 and B4 metals as the corresponding metal carbides. Stable means that the carbon exists permanently bound to the metal under the prevailing conditions with nonlabile tendency to convert to metal and dissolve carbon. Metastable means that the carbon exists transiently bound to the metal lattice under the prevailing conditions, and thermal, coulombic and/or magnetic perturbations can dislodge carbon breaking its bond to the lattice. Unstable means that the carbon exists unbound to the metal lattice due to the large activation energy necessary for the metal to react with dissolved carbon within the metal lattice. None of the metal carbides are unstable. The increasing stability (A<B2<B4<B3) of the metal carbides causes less magnetic dislodging of chemically bound carbon. B3 is stable and thermodynamics want allow the external field to dislodge carbon. Cases B2 and B4 metals form metastable carbides and the external magnetic field can dislodge carbon and reduce poisoning in these metals. The greater metastability of case A metal carbides allows easier dislodging by the external field.

The chemical dynamics occurring in case A metals that favor carbon nanotube formation result from the ease of metal carbide formation and decomposition. Such reversible dynamics allow a catalytic, cyclic process involving: 1) the chemisorption and decomposition at the decomposition facet, 2) $H_2$ desorption and carbon absorption from and into the decomposition facet, 3) carbon solid-state diffusion to the graphitizing facet, and 4) graphene precipitation at the graphitizing facet. The activation energies for each step are small and are such that interfacial-surface, magnetic, thermal and structural phenomena can modulate the dynamics of coulombic phenomena associated with theses steps in the cycle.

As a result of the chemical dynamics and transport, the case A metals are actually mesoscopic machines that convert and pump carbon from the hydrocarbon source into the carbon nanotube product. This machine acquires energy from the exothermic hydrocarbon decomposition occurring at the decomposing facet. The energy from the decomposition pumps carbon across the catalytic nanoparticle to the graphitizing facet and arranges carbon into the graphene sheet. Some energy is absorbed as heat during the endothermic graphene formation. Other energy is consumed due to the drag on the carbon by the metal lattice. Carbiding converts some of this energy to chemical energy. Carbiding also reduces the magnetic moment and exchange, thereby increasing the lattice friction on the moving carbon. The magnetic field is analogous to oil for this type of carbon pump. The magnetic field lowers the activation for carbon motion and assists flow. The magnetic field lubricates the process thereby resisting wear on the catalyst (defect formation) and clogging (carbide formation). These mesoscopic carbon pumps in case A metals work well under low carbon concentrations, which prevent irreversible carbiding and clogging. The effects of wear and clogging, however, occur in nonferromagnetic nanoparticles like case B3 (carbide formation and clogging), case B2 (stall-out, meltdown), case B4 (stall-out) and case B1 (congestion, defection and clogging). The new art involves first acknowledging this role of the magnetic field by a new mechanism, then providing better lubrication via the reinforcing external magnetic field and lowering the pumping rate for extended growth periods. The new art also proposes applying external magnetic fields to case B2 and B4 metals to reduce clogging and enhance graphene distortion into nanotubes.

In order to understand the deleterious effects of clogging, the effects of carbiding on the magnetic properties and hence the lubricating properties of the nanoparticle are considered. The chemically bound carbon is diamagnetic, however the magnetically dissolved carbon-metal alloy remains ferromagnetic. The ferromagnetism of the alloy provides the driving force and lubrication for carbon motion, resulting in nanotube formation. See FIG. 5. The diamagnetism of the chemically bound carbon results in the internal resistance to carbon motion and the inability to produce nanotubes. Saturation, carbiding and clogging, therefore, diminish lubrication causing the failure of the mesoscopic carbon pump. Catalytic poisoning or conversion of case A to case B1 results in greater internal resistance to carbon motion and the clogging and failure of the pump. The external magnetic field reduces carbon concentration and increases flow rate thereby reducing the likelihood of saturation, carbiding, clogging and therefore poisoning.

Case A metals tend to form ferromagnetic carbon solutions at low carbon concentrations and carbides at high carbon concentrations. This dissolution at low carbon concentration maintains the exchange driving force and magnetic lubrication, sustaining nanotube formation. The nano-size contributes to reduced core carbiding and increased carbon solvation for case A metals. The core compression due to surface energy allows less space for carbide formation within the interior. However, surface metal atoms are less sterically hindered from allowing necessary chemisorption and decomposition at one facet, and from allowing the necessary chemisorption and catalyzed graphene formation at a different facet of the nanoparticle. The surface and shape induced exchange anisotropy restricts these metastable chemical effects to particular surfaces: the decomposing and the graphitizing facets. The ability to reversibly carbide, which affects ferromagnetism and carbon diffusion, is therefore very important toward nanotube formation and growth. Case A catalysts reversibly carbide under low carbon concentrations.

Although interior FCC diamagnetic carbiding of case A is detrimental, the reversible, selective BCC carbiding at the graphitizing surface is necessary for nanotube formation. Therefore a good catalyst for the nanotubular process should form metastable carbide as opposed to no carbide (instability). It is this ability of case A metals that results in catalyzed nanotubular formation. The metastability, the fluctuating temperature, concentration and density gradients, and the magnetic anisotropy contribute and enhance selective surface carbiding and graphitizing at the surface precipitation site for case A. Surface metastability is also important for decomposition. The reversible, metastably carbiding importance follows from the necessary surface chemical reaction for carbon absorption and desorption at the decomposing and graphitizing facets, respectively. The important surface chemistry associated with hydrocarbon decomposition has been demonstrated. In the next section, the roles of surface chemistry involved in carbon desorption or graphene formation is considered in detail. In general this graphene formation requires metastable surface carbiding in order to pull carbon on the surface, to orient and form graphene and to weaken the forming graphene sheet for distortion and bending to nucleate the nanotube. Surface metal carbiding of edge atoms contributes to binding the nanotube and orchestrating the carbon addition. The metastability of surface metal carbides of case A metals is therefore more conducive to nanotube formation and growth than the more stable of the metal carbide (of case B3).

The late 3d transition metals (Fe, Co and Ni) form metastable carbides. The ferromagnetic character of these elements likely contributes to this metastability of their carbides. However, the magnetic phenomena are secondary to the coulombic effects and the increased electronegativity mostly weakens metal carbide bonds for these late transition metals relative to early transition metals. The resulting carbon/metal solutions of the 3d late transition metals (case A) tend to exhibit rapid carbon motion due to the metastability of carbide and due to the extra impetus of the exchange force. These metals provide the best mesoscopic machinery for pumping carbon and forming nanotubes.

Three nonferromagnetic systems are considered to show how the presence of metal carbides and/or the absence of ferromagnetism and exchange diminish carbon pumping and nanotube formation. The first example (B1) consists of carbides of ferromagnetic metals. See FIG. 6. The carbides of case A metals possess no magnetic moments and have not been observed to contribute to the carbon atom migration and nanotubular precipitation. See FIG. 6. The inability to produce nanotubes follows from the inability to decompose hydrocarbons and sustain carbon diffusion without the ferromagnetism. Actually, poisoning reflects the conversion of case A catalysts into this inactive case B1 materials. Poisoning involves clogging of the mesoscopic carbon pump. The reinforcing external magnetic field reduces carbiding and depending on the extent may regenerate case A catalyst from case B1 material.

The second examples (B2 and B4) are the mid and late 4d and 5d transition metals. See FIG. 7. Unlike the late 3d transition metals (case A), the mid and late 4d and 5d transition metals (Pd, Pt, Cu, Zn and Ag) are paramagnetic and not able to support the exchange driven mechanism important for nanotubular formation and growth. Without the exchange force, internally unhybridized carbon randomly diffuses along the periphery and within the catalyst by weak paramagnetic interactions, resulting in the formation of graphitic carbon cages about these particles. The random diffusion as opposed to the exchange anisotropy directed diffusion (case A) results in global surface graphene. The surface graphene quickly terminates the hydrocarbon decomposition. The absence of ferromagnetism results in the inability to distort the surface graphene into nanotubes. The doping of case B2 and B4 metals with case A metals produces ferromagnetism and transport, slightly enhancing the nanotube formation (Chambers et al.). The use of an external magnetic field also increases nanotube formation for B2 and B4 metals by enhancing carbon solid-state diffusion and contributes to metastable bonds with carbon. The external reinforcing magnetic field on B2 and B4 lubricates allowing better carbon pumping with some nanotube formation.

The third example (B3) is the early transition metals. The early transition metals (V, Cr, Mn, Y, Zr, Nb, and Mo) exemplify paramagnetic (nonmagnetic) systems. These metals are very weakly paramagnetic. They readily react with carbon as previously stated due to the lower electronegativity and the smaller metallic bond strength. The case B3 systems are thermodynamically prone to carbiding and clogging. See FIG. 8. The existence of stable carbides in many such paramagnetic transition metals further reduces magnetic effects, slowing transport and nanotube formation, but favoring encapsulation of the stable metal carbide. The carbiding may compete with carbon encapsulation. The strong coulombic forces associated with stable carbon-metal bonds in case B3 systems want allow the external magnetic field to force nanotube formation. The B3 metals are more subject to clogging and friction due to the propensity for carbiding.

SURFACE PRECIPITATION OF GRAPHENE SHEET

In addition to the influence of exchange in ferro-systems (case A) on transport rate and direction, the exchange force near the cooler precipitation region hybridizes the carbon atoms and orients the atoms for graphitization. See FIGS. 9 and 10. In this role, the exchange supports the graphitization necessary for nanotube formation. Graphitization is the surface precipitation of graphitic carbon. The graphitization occurs at a specific crystallographic facet of the nanoparticle's surface (Baker et al.). The surface specificity is related to the magnetic influence on the graphitization process.

The surface specificity was discussed in the decomposition section and was attributed to the graphitizing surface having the same direction as the magnetic field. This graphitizing surface has the BCC, high spin structure and a smaller surface area relative to the other surfaces, making up the nanoparticle's surface. Other surfaces have directions non-collinear with the nanoparticle's magnetic field. Therefore, the other facets form amorphous carbon. These other facets and surfaces are not able to graphitize due to the instability of paramagnetic $s^1p_x^1p_y^1p_z^1$ carbon atoms on these surfaces relative to the graphitizing surface of the nanoparticle. Carbon atoms generated or randomly migrating to these nongraphitizing facets are pulled by the exchange into the interior and directed to the graphitizing facet. The accumulation of $s^1p_x^1p_y^1p_z^1$ carbon leads to graphitization in this region of the nanoparticle. See FIG. 9.

In addition to graphene or diamagnetic 6-member ring formation, the paramagnetic $C_5$ rings form and they are stabilized electronically by metastable chemisorption to the catalytic surface. The 5 member rings are paramagnetic and therefore interact more favorably with the ferromagnetic catalytic nanoparticle. As will be discussed more, the 5 member rings contribute to the bending of the graphene sheet during the development of the dome, leading to the nanotube. Therefore the spin density gradient and anisotropy direct carbon atoms to the graphitizing region, causing surface specificity. The carbon accumulation and $s^1\,p_x^1\,p_y^1\,p_z^1$ stabilization result in graphene formation and $C_5$ member formation.

The graphene sheet and defective 5 member rings form parallel to the graphitizing facet of the catalyst. The parallel formation involves prior surface carbiding especially under low temperature conditions. Surface carbiding accompanies the carbon buildup at this surface. The carbiding begins at the edge atoms, spreading inward along the terrace. Graphene formation follows the surface carbiding at the graphitizing facet. See FIGS. 9 and 10. The graphitizing facet has the lower density BCC structure and hence sterically allows this graphitization. The BCC region possesses the largest magnetic moment, hence, magnetically facilitates graphitization. The parallel precipitation of the graphene sheet to this facet arises because this arrangement allows better chemisorption and overlap of s and p orbitals of the carbon with s and d orbitals of the catalyst surface. See FIG. 9. These orbital interactions form metastable surface carbides. The metastable surface carbiding facilitates the exchange with the metal, the hybridization of the surface carbon atoms from $s^2p_x^1p_y^1p_z^0$ to $s^1p_x^1p_y^1p_z^1$, and the stabilization of $s^1p_x^1p_y^1p_z^1$ for graphene formation.

Surface forces due to the small nanoparticle size enhance the chemisorption and exchange induced graphitization. The more prominent BCC edge atoms on the smaller 20–50 angstrom nanoparticles more easily chemisorb and graphitize carbon atoms than the reactions occurring at the BCC terrace sites. This ease of chemisorption and graphitization by the edge metal atoms results from the higher free energy of edge atoms due to the larger unsaturation relative to terrace atoms. The graphene sheet therefore nucleates at the edge of the facet and grows inward onto the terrace. The increasing diamagnetic instability with inward graphene growth induces and stabilizes paramagnetic $C_5$ ring formation, assisting the distortion and nanotubular dome construction. As will be considered more in the next section on electronic bond weakening, the parallel graphene formation assists the necessary chemisorption of the sheet and the resulting electronic bond weakening. Therefore, the parallel formation and unsaturation of the smaller nanocatalyst enhance exchange interactions between the nanoferrocatalyst particle and surface carbon atoms, leading to the hybridization necessary for graphene formation.

This enhancement of graphene formation due to the exchange interaction follows from considering and comparing the mechanism occurring for the dissolved carbon with the mechanism occurring for isolated carbon atoms of say a plasma. As opposed to two isolated carbon atoms, wherein s electrons must randomly gain both activation energy, angular momentum and a spin flip for $s^1p_x^1p_y^1p_z^1$ hybridization and graphene formation, the carbon solute in the ferromagnetic catalytic particle (case A) more easily obtains electronic energy and spin/orbit momenta from the surface and temperature induced fluctuating exchange interaction with d electrons of the catalytic solvent. In other words, the exchange coupling between the carbon and the metal as well as surface carbiding with the metal leads to coupled spin transitions in carbon. The spin density waves and spin transitions of the catalyst contribute to the change in carbon spin during hybridization. These coupled spin transitions lower the activation for graphene formation. See FIG. 9. This magnetic influence on carbon hybridization is revealed by the temperature dependent graphitization for the different catalyst. On the basis of experimental work of Jia et al., Fe and Co graphitize at temperatures as low as 600° C. and Ni graphitizes at 900° C. B2 and B4 metals graphitize surface carbon at temperatures greater than 1500° C. Isolated carbon atoms require 3000° C. for similar graphitization (Stein et al.). These different graphitization temperatures reflect the relative magnetic moments of the catalysts: Fe>Co>Ni and the influence of these moments upon the electronic transitions and therefore activation energies necessary for hybridization and enhanced graphene formation. Fe having the largest moment exerts a stronger force and coupling with electrons of carbon to effect the necessary energy/ momentum transitions for hybridization at lower temperature. Ni has the smallest magnetic moment so more thermal factors must contribute to graphitization. The ferromagnetism therefore accelerates graphitization by lowering the activation energy for hybridization. The s orbital acceptor induced activation of carbon toward $sp^2$ hybridization to form benzene has been demonstrated for Co (Pan et al.) and Fe (Schnabel et al.) molecular cluster. A similar activation applies to the nanocatalyst, where edge atoms approach the electronic configuration of the molecular clusters.

The paramagnetic particles of case B lack this magnetic influence and they produce amorphous carbon deposits and or graphitic shells as opposed to the nanotube. Such effects in nonferromagnetic, catalytic systems provide more evidence for the magnetic importance to nanotube formation. Case B3 metals produce amorphous carbon. Cases B2 and B4 metals produce a graphitic shell. The amorphous carbon formation for B3 metals follows from the carbiding and inability of these metals to undergo $s^2d^n \leftrightarrows$ to $s^0d^{n+2}$ transitions to catalyze and provide the electronic energy and angular/spin momenta for hybridizing carbon atoms. After hydrocarbon decomposition unhybridized $s^2p_x^1p_y^1p_z^0$ carbon atoms move within the B3 metals. The unhybridized carbon atoms, therefore, form metal carbides or amorphous carbon. See FIG. 8. The absence of ferromagnetism and $s^2d^n \leftrightharpoons s^0d^{n+2}$ transitions results in the absence of hybridizing phenomena. On the other hand, the B2 and B4 metals have the electronic structures to undergo $s^2d^n \leftrightharpoons s^0d^{n+2}$ transitions, but the exchange is too weak for ferromagnetism. So the B2 and B4 metals have $s^0d^{n+2}$ configurations and, therefore, globally catalyze graphene formation. The B2 and B4 metals therefore allow surface graphitization, however the reaction requires much higher temperature than case A metals due to the lack of ferromagnetism. Moreover, the lack of ferromagnetism results in graphene forming about the whole nanoparticle. See FIGS. 1I, and 7. As discussed in the next section, these B2 and B4 metals lack the magnetic moment to bend these sheets to nucleate the nanotube dome. These mechanisms are consistent with the three types of carbon deposits observed by Shelton et al.

Therefore, the magnetic field is not necessary for the graphitization, but the intrinsic magnetic field does lower the temperature required for graphitization. Electronic structure determines catalytic abilities. Temperature makes up for low magnetic field intensity in causing the necessary spin transitions and hybridization necessary for graphene formation. In this section, the importance of the magnetic field to graphene formation is proven by first considering the ferromagnetic mechanism in case A metals and then contrasting this ferro-mechanism with the mechanism occurring in the nonferromagnetic case B systems. Comparing the electronically similar nonferro-system B4 with the ferro-system A eliminates the contribution of coulombic force to this effect, highlighting the magnetic importance. On the basis of these comparisons, the magnetic field enhances the graphene formation.

As a result of this magnetic importance, the intrinsic magnetic force in case A catalyst leads to selective graphitization at one facet of the nanoparticle. An external reinforcing magnetic field enhances these intrinsic effects. The reinforcing external magnetic field enhances hybridization. The external field provides more stability to the hybridized carbon atoms within the catalyst.

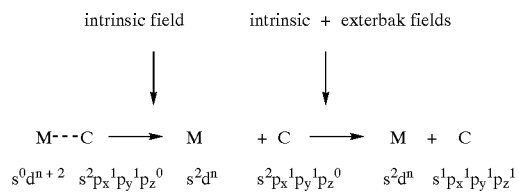

The intense external field raises the instability (relative to the intrinsic effect) of hybridized $(s^1p_x^1p_y^1p_z^1)$ carbon at nongraphitizing surfaces, pulling more of the $(s^1p_x^1p_y^1p_z^1)$ carbon atoms to the graphitizing facet. The reinforcing field therefore contributes to enhanced formation of nanotubes via its effect on the graphitization process. The external magnetic field also produces such hybridization and stabilization in case B2 and B4 metals. The external magnetic field, therefore, contributes to selective graphitization at a particular facet of the B2 and B4 metals, thereby leading to nanotubular formation on B2 and B4 metals.

ELECTRONIC DISTORTION OF GRAPHENE SHEET

For the case A, during and/or after parallel sheet formation on the graphitizing facet of the catalyst, the graphene sheet is bent to form the nanotube. Coulombic and magnetic forces from the catalyst contribute to this bending. These coulombic and magnetic forces assist the bending due to the chemisorption by the intimate interaction between the sheet and the catalyst. It is this type of interaction that necessitates carbiding by the catalysts. For case A metals, as a result of this interaction the almost filled orbitals of the metal increase electron density in the $\pi^*$ orbitals of the graphene sheet. See FIG. 11. Such interactions with the $\pi^*$ orbitals of the graphene sheet weaken the $\pi$ bonding in the sheet allowing easier distortion on case A metal surfaces. This electron transfer from metal d orbitals to $\pi^*$ of the graphene sheet is enhanced by the magnetic field because the transfer increases electron spin in the graphene sheet, reducing diamagnetic repulsion of the sheet.

These electronic interactions between the catalyst nanoparticle and the graphene sheet are modulated by temperature fluctuations and accompanying phonons within the catalyst. These phonon and vibrations of the catalyst are electronically coupled to the graphene sheet, causing the concerted motion and distortion of the sheet. The LO vibrations of the metal nanoparticle involve stretching and compression of metallic bonds. As previously stated, the intrinsic magnetic field in the case A catalyst reduces the activation for such bond vibrations. The LO vibrations therefore occur at lower frequencies. The intrinsic magnetic field therefore allows lower LO frequency phonons for coupling with the nanotube, causing its distortion. See FIG. 11. Such low frequency vibrational effects are important, since Kanzow et al. demonstrated the need for concerted motion of the sheet atoms in order for bending. Such concerted motion of the sheet atoms requires lower frequency modes relative to the vibrational frequency within the B4 nanoparticles. The intrinsic magnetic fields in case A metals slow the vibrational frequency relative to the modes of B4 metal lattices, causing stronger coupling with the adjoining graphene sheet and causing easier distortion. Weakened $\pi$ bonds in the sheet synergize this concerted motion of graphene sheets on case A metals. This electronic, magnetic and vibronic coupling between the graphene sheet and the case A metals enhance sheet distortion into the nanotube. The smaller coupling in B2 and B4 metals results in the inability of these metals to distort their surface graphene sheet into nanotubes.

Although this may be the first realization that the magnetic field affects the LO phonon energy of the particle, thereby affecting the graphene sheet distortion, other investigators have explored the effect of an external magnetic field upon the as formed nanotube itself It is important to clarify that these investigators used magnetic fields on the nanoparticle itself in order to see how the field affects the nanotube. They did not explore how the field affects the nanotubular formation. By considering their results, my correlation of electronic, magnetic and vibronic coupling to the mechanism of nanotubular formation is justified. The coupling of electronic and vibronic states of the nanotube to an external magnetic field has been observed experimentally as previously stated. B. W. Smith et al. experimentally demonstrated the structural nanotubular axial alignment with an external magnetic field. Theoretically, Hjiki and Ando demonstrated the splitting of the nanotube's electronic bands by external magnetic fields. The electronic, magnetic and vibronic states of the catalyst nanoparticle are therefore intimately coupled to the graphene sheet and contribute to distortion and bending of this graphene sheet.

These electronic, magnetic and vibronic effects do not occur for case B substances. The case B substances also are therefore limited in this way toward nanotube formation. Actually as stated before, many case B3 metals prefer carbide formation. In addition these case B3 metals lack d electrons to form, weaken and vibrate the sheet bonds. Therefore, for B3 metals typically accumulate amorphous surface carbon and any graphene sheets that may appear at the surface never bend to form the nanotube. Experimentally in agreement with this model, it has been observed that these type B3 particles become encapsulated by amorphous carbon.

On the other hand, case B2 metals (the late 4d and 5d transition metals) have plenty of electrons to weaken the sheet. However, they do not share these electrons as easily as the mid 3d metals. These B2 metals, therefore, do not form metastable carbides so there is no intimate interaction and therefore no coupled electronic, magnetic or vibronic effects between the B2 nanoparticles and the sheet to cause sheet bending and distortion. B4 metals tend to more easily carbide than B2 metals, so B4 metals tend to weaken surface graphene bonds. However, they do not have magnetic moments to distort the weakened graphene sheet. In agreement with this model, experimentally it has been observed that these B2 and B4 metals become encased by thin layers of graphite rather than form nanotubes. The consistency of this magnetic, electronic, and vibronic model is even more resounding by comparing B2, B4 and B3 metals. B3 metals are thickly encapsulated by carbon whereas thin graphitic shells in cage B2 and B4 metals. B3 metals lack enough d electrons to catalyze graphene so carbon deposits on these metals and corresponding metal carbide surfaces. Thin graphitizing for B2 and B4 metals follows from the catalytic effects of d electrons on the surface carbon at high temperatures to form graphene. Although B2 and B4 metals graphitize, the poor interaction with the resulting graphene sheet does not facilitate distortion to nucleate the nanotube.

These intrinsic magnetic effects within the case A catalyst result in the weakening of the growing graphene sheet, allowing subsequent bending and distortion under the influence of the intrinsic magnetic field. In this invention, the reinforcement by an external field enhances these effects of bond weakening. Therefore, the external field enhances the necessary bond weakening for graphene sheet distortion to nucleate the nanotube. The reinforcing field also provides a magnetic effect so as to weaken graphene sheets on B2 and B4 metals. Graphene readily forms on the B2 and B4 metals. The external field provides the interactions through bond and through space to bend these graphene sheets and support nanotube formation on B2 and B4 metals. Although these novel effects of the magnetic field lead to increased nanotube growth on B2 and B4, the effects are not enough to cause greater nanotube production relative to case A metals. The reinforcing external magnetic field provided by this invention, therefore, contributes to the mass production of carbon nanotubes via its effect upon the weakening of the graphene sheet and the nanotube nucleation by distorting the sheet.

MAGNETIC DISTORTION OF SURFACE GRAPHENE SHEET

In addition to the sheet weakening effect due to these electronic and magnetic forces of the 3d late transition metals nanoparticles, these metals of case A exert intrinsic, repulsive forces through space on the weakened puckered graphene sheet due to the inherent, magnetic moment of the catalyst nanoparticle and the resulting push (repulsion) on the diamagnetic graphene sheet. See FIG. 12. Furthermore, the intrinsic magnetic field distorts and induces magnetism in the attached nanotubular wall. The direction of the intrinsic magnetic field of the catalyst nanoparticle is normal to the graphitizing surface and also to the initially undistorted graphene sheet.

It is important to specify the directions relative to the nanocatalytic precipitating or graphitizing surface. The magnetic field is normal to the graphitizing nanoparticle surface. See FIG. 10. The graphene sheet forms parallel to this graphitizing surface (Kanzow et al.). So the magnetic field is normal to both the graphitizing surface and the nucleated graphene sheet. The bending orients the graphene sheet normal (see FIG. 13) to the graphitizing surface of the nanocatalyst after nanotubular shaping and elongation. In this new art, I suggest that this bending and distortion are electronically (bond weakening), thermally (high temperature) and magnetically produced. The electronic and thermal contributions were considered in the last section. This section considers the details of the magnetic contribution to graphene sheet distortion to form the nanotube. The diamagnetic force of the ferro-nanoparticle upon the electronically weakened graphene sheet initiates the distortion to construct the dome or cap. See FIG. 12. The distorted sheet elongates to produce the nanotubular wall, which is held open by its bonds to edge atoms of the nanoparticle at one end and capped by the dome at the other end. See FIG. 13. The nanotubular wall and axis orient normal to the nanoparticle surface. See FIG. 13. The nanotubular axis is therefore oriented parallel to the intrinsic field of the nanoparticle.

Smith et al experimentally demonstrated a similar alignment of the nanotubular axis with an external magnetic field. On the basis of this alignment of the finished tube, a similar alignment is expected during growth in the intrinsic magnetic field of the ferronanoparticle. The development of the nanotube at the nanoparticle's surface, therefore, involves electronic forces (which weaken the parallel sheet bonds), thermal factors (which cause concerted sheet bending and distortion) and diamagnetic forces (which push the parallel sheet outward to form the dome and direct the developing nanotubular axis along the magnetic field direction). The parallel sheet therefore refers to the initially nucleated sheet, which is parallel to the nanoparticle's graphitizing surface. The normal graphene sheet refers to the sheet wall of the subsequent nanotube, which is normal to the graphitizing surface. See FIG. 14.

This normal orientation of the magnetic field with the nucleated graphene sheet leads to repulsive magnetic interactions between the sheet and the ferronanocatalyst. A similar repulsive interaction has been observed between the magnetic fields and graphite. This repulsive interaction results from diamagnetic ring currents induced in the graphite by the external magnetic field. The diamagnetic ring current is the accelerated motion of the conjugated electrons in response to an external magnetic field. The diamagnetic susceptibility of graphite due to ring currents has been demonstrated experimentally and theoretically. The diamagnetic susceptibility of graphite was observed by Haddon et al. to be larger than $C_{70}$, which was measured larger than the diamagnetic susceptibility of $C_{60}$. The decreasing susceptibility from graphite to $C_{70}$ to $C_{60}$ follows from the increasing fraction of paramagnetic 5 member rings. The graphene sheet formed on the ferronanocatalyst experiences a similar diamagnetic force due to the intrinsic magnetic field of the nanoparticle. The diamagnetic force on the growing and nucleated sheet by the catalyst nanoparticle causes the bending and distortion of the graphene sheet to form the nanotube and $C_5$ member ring formation.

Furthermore, during the distortion and bending of the weakened sheet, the catalytic surface metal atoms may convert some $C_6$ rings to $C_5$ and $C_7$ rings. The $C_6$ conversion relieves some of the diamagnetic tension, since $C_6$ is diamagnetic and $C_5$ is paramagnetic. Andriotis et al computationally demonstrated such $C_5$ ring generation by electronic stabilization by Ni atoms. This kind of $C_5$ ring formation also relieves strain during nanotubular formation and in the final dome structure of the nanotube. See FIG. 12. Moreover, the $C_5$ rings are paramagnetic and interact more favorably with the ferronanoparticle. See FIG. 13. The $C_5$ rings not only contribute to reduced bond strain in the forming dome, the paramagnetic $C_5$ rings in the dome are stabilized through space by the inherent magnetic field of the catalyst nanoparticle relative to the original parallel graphene sheet.

In addition to the thermodynamic stability of the nanotubular dome in the nanocatalyst's magnetic field (relative to the original parallel graphitic sheet), the subsequent normal orientation of the nanotubular wall (containing 6 member diamagnetic rings) to the nanoparticle catalyst surface and the nanoparticle's magnetic field direction results in the nanotubular wall stabilization via the wall structural distortions and band gap formation. This stabilization of the graphene wall results from the paramagnetism developed by the band gap formation. See FIG. 13. T. Ando demonstrated the lattice distortion and band gap formation in the nanotubes that are coaxial with external magnetic fields. M. F. Lin demonstrated the changing (diamagnetic to paramagnetic) magnetic behavior of fullerenes in external magnetic fields. Experimentally, the nanotubular lattice distortions in the magnetic field have been observed by nanotube formation in arc discharge systems using external magnetic fields. The disadvantages of the arc discharge have been stated. An additional disadvantage involves the thermal and magnetic quenching during the arc discharge process. This quenching does not allow annealing of the magnetic induced structural defects. The more steady CVD technique allows the annealing of the wall defects and distortion by subsequently maintaining the temperature while slowly reducing the magnetic field.

The inherent magnetic field of the nanocatalyst provides an parallel incident magnetic field to the nanotube wall during growth. Just as an external magnetic fields exerted by Ando and Lin bend the lattice and splits the electronic states, the inherent nanoparticle field bends the nanotubular lattice and splits the nanotubular electronic states during the nanotubular growth. As a result of this intrinsic magnetic field on the tube wall, band gap development and lattice distortion therefore occur after nucleation of nanotube dome and elongation of the nanotube wall on the ferrocatalytic nanoparticles. The band gap and lattice distortions magnetically stabilize the nanotube wall in the presence of the intrinsic magnetic field of the nanoparticle catalyst. Such stabilization also occurs upon applying the reinforcing external field. The stabilization results from the development of high spin states and ferromagnetism due to the larger band gap formation induced by the stronger external field. Under the influence of the intrinsic nanocatalytic magnetic field, the nanotube therefore becomes magnetic and is held to the surface of the nanoparticle catalyst by magnetic attraction. See FIG. 13. Under the influence of a reinforcing external magnetic field, the tube is held even more strongly to the catalyst's surface.

The developed ferromagnetism in the nanotube is facilitated by the external field superimposed on the nanoparticle field; the high temperature and the phonon coupling between the nanoparticle and the nanotube; and finally the coupled spin and magnetic phase transitions of the nanoparticle catalyst with the nanotube. See FIG. 13. M. F. Lin demonstrated similar induced paramagnetism in the carbon toriods. T. Ando also demonstrated diamagnetic transitions to paramagnetism in nanotubes. Larger effective magnetic fields cause larger nanotubular band gaps and lattice distortions. But, the operating temperature is high enough to excite electrons across the wider band. Furthermore, the spin coupling between the nanotube and the ferronanoparticle allows spin flips to triplet bands and the possible high spin ferromagnetic state of the nanotube. The high spin ferromagnetic state is sustained by the external magnetic field and contributes to longer nanotube growth time. It may follow that part of the difficulty of nanotubular adhesion in the intrinsic magnetic field of the nanoparticle results from the weaker magnetic binding as the nanotube grows. The strong external field increases the binding, allowing for prolong contact for longer nanotubes. The nanotubular ferromagnetism and lattice distortion are reversibly removed by slowly reducing the external magnetic field at high temperatures, allowing annealing of the nanotube walls to form the perfect lattice after growth.

All together, the electronic transitions between nanoparticle and nanotube, the diamagnetic force on the nanotube, the phonon coupling, the distortion of the graphene sheet, the $C_5$ ring nucleation and the dome nucleation are concerted, synchronized and modulated by temperature, spin and structural transitions in the nanoparticle catalyst. Furthermore, the resulting dome and tube wall of the nanotube are held to the nanoparticle magnetically as a result of magnetic, excited high spin states in the nanotube wall via distortions and band gap formation under the thermal, magnetic and vibronic coupling between the nanoparticle and nanotube. The metals in case B lack both the electronic structures to weaken the sheet and the large magnetic moment to bend the sheet. The metals in case A can therefore more easily bend the sheet, nucleating the carbon nanotube. This consideration demonstrates the magnetic significance to nanotubular nucleation. These effects of case A metals are enhanced by the superposing external magnetic field. The external magnetic field produces similar graphene distortion on B2 and B4 metals, but to a lesser extent than the distortion for case A metals.

STABILIZATION AND GROWTH OF THE DISTORTED GRAPHENE SHEET

The bond weakening and inherent diamagnetic tension for case A metals reveal the instability of the parallel graphene sheet relative to the normal graphene sheet of the nanotubular wall. This instability results in the dome formation and nanotube nucleation. The instability of the parallel sheet further suppresses nucleation of a second sheet, relative to the growth of the existing distorted sheet into the nanotube. The same electronic and magnetic factors, that distort the nucleated sheet, suppress nucleation of a second interior graphene sheet. The intrinsic magnetic field, therefore, suppresses the multiwall nanotube development. A reinforcing, external strong magnetic field therefore retards even more the multi-walled carbon nanotube formation.

Size effects supplement these magnetic and electronic factors that distort the graphene sheet into the nanotube and suppress multitubular formation. The size of the catalyst determines the nanotube diameter. As the catalyst size increases, the nanotube diameter increases. For larger nanocatalyst/nanotube system, the carbon atoms appearing at the precipitation region have to diffuse farther to reach the catalyst/nanotube interface. This larger diffusion length allows for more C—C collisions and for greater nucleation probability of a new graphene sheet within the interior of the existing nanotube. The smaller nanoparticles therefore reduce nucleation probability. The nucleation probability is even further reduced by the faster carbon diffusion on the terrace relative to the rate along the edge. Faster motion results in less time for sheet formation. Therefore, the smaller size enhances single wall development.

In addition to the greater nucleation probability due to more carbon collisions and longer collision times for larger nanoparticles, the longer resulting sheets become more difficult to bend into the nanotube by concerted distortions (Kanzow et al.). The concerted distortions are driven by spin density waves and phonons of the catalyst nanoparticle. Such concerted motion becomes more difficult with more atoms in the longer graphene sheet. The longer (micron-size) sheet formed on the larger nanoparticle is, therefore, not able to distort into a nanotube, but remains parallel to the catalyst surface and develops into a multilayers to form a solid filamentous carbon rod. See FIG. 16. But for smaller catalytic particles, the bending of the interior graphene sheets becomes easier, forming nanotubes within the existing nanotube. See FIG. 15. This nucleation of nanotubes within an existing nanotube results in multiwalled nanotubes.

In addition to the catalytic size effect on carbon diffusion and graphene sheet nucleation, the size also determines the intrinsic catalytic properties that contribute to graphene sheet formation. Smaller nanoparticles tend to be single domain; hence the intrinsic magnetic field per metal atom acting on the sheet is larger. Smaller catalyst particles experience larger effects of surface density waves. Smaller catalyst particles have lower melting temperatures, allowing easier FCC to BCC structural transitions and easier spin frustration and exchange gradient development. Smaller catalyst particles are subject to easier magnetic phase transitions because of the larger surface to volume ratio and the larger proportion of surface to core atoms. Smaller catalyst particles have smaller coercivities, changing field direction more readily. Some B2 and B4 metals become ferromagnetic with decreasing size. Therefore, smaller B2 and B4 metals nanoparticles can express more nanotube formation. Smaller catalyst particles expose more edge atoms, which are really subject to the chemical and magnetic surrounding. The edge atoms at the graphitizing facet more easily form carbides, allowing the stronger attachment of the nanotube to the catalyst. See FIG. 17. All of these attributes of smaller catalyst nanoparticles favor single wall nanotube formation and growth.

These size influences on nanotube formation reach a lower limit beyond which other factors inhibit nanotube formation. The magnetic field is important for limiting nanotube formation on nanoparticles with very small diameters. For the smaller nanoparticles (20–30 Angstroms), the net magnetic moment is equal to the sum of the atoms forming the nanoparticle. Therefore, with decreasing size and fewer atoms, the magnetic field becomes less. Smaller magnetic fields lead to less magnetic influence on the mechanism for nanotubular formation. A smaller magnetic field environment results in less spin density phenomena, diamagnetic push on the surface graphene to distort it into the nanotube and less induced ferromagnetism and binding of the nanotube to the particle. Finally, as the particle size becomes too small, the bond strain in the dome and walls becomes too great for stability. Therefore below a certain size, the magnetic environment of the nanoparticle and the bond strains in the resulting nanotubular dome and walls restrict the nanotube formation.

In general with decreasing catalyst size the C atoms convert from graphene rods to multiwalled nanotubes to finally single walled nanotubes. See FIGS. 14–16. The normal magnetic field assists bending the interior graphene sheet. However, more important is the fact that the normal magnetic field raises the free energy of the parallel oriented graphene sheet (prior to bending) relative to the perpendicularly oriented graphene sheet (after bending), which constitutes the outer nanotube. This diamagnetic effect suppresses the parallel sheet formation while enhancing the diffusion of the surface C to the graphene/catalyst interface, thereby contributing to single wall nanotubular growth. This is consistent with the observed insertion of $s^2p_x^1p_y^1p_z^0$ C into fullerenes by Endo and Koto. In this way, a stronger magnetic field inhibits multiwalled nanotube formation, favoring the single walled nanotube formation and growth.

The inhibiting effect of the intrinsic magnetic field for case A catalyst is enhanced by the external field, allowing the build up of more carbon at the graphitizing facet without the formation of an interior sheet. These effects of the external magnetic field allow mass production of the single walled nanotube without multiwall impurities.

GROWTH OF THE SINGLE WALLED NANOTUBE

In addition to the nucleation and stabilization of the single wall nanotube, the nano-ferrocatalyst allows the efficient growth of the nanotube by forming metastable bonds with the tube opening and allowing the addition of C atoms, which have migrated from the precipitation site, to the interface. Differences in saturation result in the fast migration of carbon atoms from the terrace to edge metal atoms. See FIG. 14. The induced nanotubular ferromagnetism binds the nanotube to the nanocatalyst. The metastable interaction contributes to the necessary wetting of the graphene sheet by the catalyst nanoparticle for the growth and nanotubular elongation. This metastable interaction is enhanced for smaller particles, which have more pronounced edge atoms. The tendency of edge atoms to metastably carbide allows carbon atom addition to the tube at the interface. The edge atoms of the catalyst are very unsaturated allowing the simultaneous binding of the nanotube ring and the interior and surface carbon atoms, thereby facilitating the addition of surface carbon atoms to the nanotube. The edge metal atoms dynamically bend the tube periphery and release $C_2$ units to it (Endo and Koto). See FIG. 14. This $C_2$ addition to the nanotube is thermodynamically feasible due to the high chemical potential of $C_2$ on the terrace relative to on the edge metal atoms. The lower chemical potential funnels carbon atoms from the terrace to the edge to the nanotube. This funnel prevents carbon accumulation on the terrace and multiwalled nanotube formation. The conversion of 2 $C_6$ rings into $C_5$ and $C_7$ rings by edge metal atoms distorts the nanotube boundary and assists the $C_2$ addition to the boundary. Calculations by Saito demonstrate the formation of $C_5$ and $C_7$ rings from $2C_6$ rings. $C_2$ then combines with $C_5$ rings to form $C_7$ rings. $C_7$ combines with grown $C_5$-M interfacial structures to form $2C_6$ rings. It has been demonstrated computationally by Andriotis et al. that the Ni atoms stabilize these intermediate $C_5$ rings until carbon atoms diffuse in to produce the 6 member stable ring or $C_7$ rings convert them to $C_6$ rings. This type of model is also supported by the role of $H_2$ in none catalytic nanotubular formation in arc discharges. For these processes, $H_2$ and the electric field keep the ring open during tube growth (Colbert et al.).

The intrinsic magnetic field of the case A ferronanocatalyst affects the $C_2$ addition to the nanotube in at least three ways. First the intrinsic field holds the nanotube to the nanocatalyst via magnetic interaction. The second role of the intrinsic magnetic field in assisting single wall nanotubular growth involves its affect upon the metastability of surface metal carbides. Stronger effective magnetic fields increase the instability of the surface carbon bonds. This effect has been cited to suppress interior sheet nucleation and multi-wall development through its weakening of terrace metal-carbon bonds. Furthermore, this effect, to a lesser extent, weakens the edge metal atom-carbon bonds, which at first would seem detrimental, leading to the detachment of nanotube from the nanoparticle. However, the magnetic attraction accommodates this loss in electronic adhesion. Moreover, the weaker metal edge atom and nanotubular carbon bonds also means weaker bonding with surface carbons, causing easier and faster addition of surface carbon to the nanotube.

The third role of the intrinsic magnetic field in assisting the single wall nanotubular growth involves it influence upon the nanotube wall. In the presence of the intrinsic magnetic field, the nanotube wall distorts and develops a band gap. The band gap allows the excited state nanotubular ferromagnetism described by the first role. The distortion of the nanotube facilitates the nanotubular structural changes associated with the formation of ring intermediates:

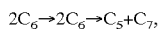

the formation of graphene rings by $C_2$ addition:

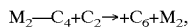

And other nanotubular bond rearrangement near the opening associated with carbon atom addition and nanotubular elongation. The reinforcement by the external magnetic field enhances these three roles of the intrinsic field during the single wall nanotube growth.

SUMMARY

The ferromagnetic nature of the catalyst in case A therefore slows the decomposition of the hydrocarbon to carbon atoms; reduces the surface and interior carbon concentrations; reduces carbon supersaturation and catalytic poisoning; pulls the carbon atoms into the interior of the catalyst; drives and directs the migration of carbon atoms across the catalyst particle from the decomposing facet to the graphitizing site; orients and provides the electronic energy and spin/angular momenta for graphene formation from dissolved C atoms; directs carbon atoms from terrace to edge metal atoms due to the higher electronic and magnetic free energy of the terrace atoms, initiates graphene formation at the edge with lateral growth inward across the terrace; distorts the graphene sheet during its growth across the terrace via bond weakening and diamagnetic repulsion to nucleate the nanotube; reduces mutli walled nanotube formation relative to single walled nanotube formation; induces ferromagnetism in the nanotube to magnetically hold it to the nanoparticle during growth; and increasing the rate of carbon atom addition to the nanotube. Although the adsorption, decomposition, diffusion and precipitation steps contribute to the overall rate, it has been demonstrated that the carbon atom internal diffusion step is rate limiting for the overall formation of carbon nanotubes. These steps form a cycle. The cycle involves a mesoscopic pump for directing carbon from the hydrocarbon source into the graphene product. The magnetic field acts as a lubricant for this process. By increasing the rate of all of these processes by applying an external magnetic field, the formation is enhanced. In this invention, the external field has its greatest effect by increasing the pull of carbon through the carbon/metal solution, thereby increasing the lubrication of the mesoscopic carbon pump. Furthermore, in this new art by reducing the interior carbon concentration, the external field reduces catalytic poisoning, thereby reducing wear and clogging of the pump and allowing extended nanotubular growth time.

DETAILED ACCOUNT OF THE INVENTION MCCVD APPARATUS

Because of this influence of the intrinsic and external magnetic fields on the nanotube formation, the invention creates an external magnetic field to enhance the phenomena. FIG. 17 demonstrates the apparatus used to create an external magnetic field within a CCVD reactor. A CCVD reactor is vertically inserted within the bore of a superconducting magnet. The CCVD reactor is equipped with $H_2$ and Ar carrier gases, a precursor (ferrocene) evaporator, a quartz reaction chamber, a Watlow high temperature heating and control system, an adjustable graphitic resistance heated sample holder, a cold trap and a vacuum pump. See FIG. 17.

The carrier gases are routed into the reaction chamber via stainless steel tubing. The Ar and $H_2$ flow rates are regulated by mass flow meters. The carrier flow rates and evaporator temperature determines the precursor concentrations and flow rates. The resistance heated sample holder is used to grow Fe nanoparticles only on the substrate while the reactor chamber is maintained at sub reaction temperatures. The quartz reaction chamber is 1 inch in outer diameter. The quartz reaction chamber is connected to the stainless steel tubing via an O-ring quick fit-connection at the reactor inlet and outlet. The Watlow heating and control systems consist of 6 multicell heaters surrounding an internal speciment tube. The heaters and internal speciment tube are encased by 1 inch thick insulating material to protect the magnet from the high temperatures of the furnace. The furnace temperature is monitored using dual point sensing thermocouples. A ramp and soak controller accepts thermocouple input. The cold trap is a glass chamber cooled by liquid nitrogen. This trap, prior to the mechanical pump, captures all un-reacted precursor.

The quartz reaction chamber and furnace are mounted within the bore of a superconducting magnet. The magnet has a bore radius of 0.2 m. The bore length is about 1.16 m. The magnetic field is parallel to the bore axis and CVD reactor axis. Magnetic fields as high as 20 tesla maybe sustained during the nanotube formation. The magnetic field is parabolic along the length and along the radius of the bore. Axially, the field increases from the edge toward the center then decrease from the center toward the other edge. Radially, the field increases from the center to the wall of the bore. The magnet is actually a system at the Florida National High Magnetic Field Laboratory.

Because of the magnetic field gradient within the bore, a force is exerted on the Fe nanoparticles normal to the field direction and parallel to the magnetic field gradient. The force is in the direction of the magnetic field gradient. This force is therefore normal to the bore axis and radially outward. Because of this force and the position of the substrate holder, the Fe nanoparticles are pressed against the substrate. Because of this force on the Fe nanomagnets, the Fe nanoparticles are deposited under zero external field conditions. The Fe nanoparticles are actually formed by entraining the ferrocene (bis(cyclopentadienyl)iron or $(C_5H_5)_2Fe$) in the carrier gas (10 sccm) via the evaporator (T=30° C.). The substrate temperature is held at 180° C. and the reaction chamber is held at 100° C. in order to ensure Fe nucleation only on the substrate. The Fe nanoparticles are grown for about 10 minutes to a size 30A. STM and AFM determined the size of the Fe nanoparticle under these conditions and growth time. After formation, the Fe nanoparticles are annealed at 900° C. under a strong magnetic field (20T) to orient all the moments of Fe nanomagnets with this external field. See FIG. 18.

Following Fe nanoparticle nucleation, growth, annealing and orienting, introducing methane grows the C nanotubes. Methane is introduced at a flow rate of 1200 cubic centimeters per minute. The graphene sheets form at the graphitizing site with orientation normal to the external field. See FIG. 18. The external field distorts the graphene sheets, nucleating the nanotubes. Holding the field at 20T during the first minute of methane flow does the bending. As a result of the diamagnetic assisted bending, the graphene sheet becomes the nanotube wall and the nanotube wall becomes oriented normal to the external magnetic field.

The external magnetic field is applied normal to the precipitation facet. The sample holder may modify the field direction. The apparatus is designed so that the external field may be oriented in different directions relative to the Fe nanoparticle and growing nanoparticle by rotating and tilting the sample holder. This versatility allows the orientation of the external field so as to optimize the production amount and rate of the nanotube.

This invention may allow the use of higher temperatures to grow carbon nanotubes. The external magnetic field reduces the activation energy for solid state diffusion allowing more mobility at higher temperature with reduced supersaturation. Higher temperatures allow longer adhesion of the nanotube to the Fe nanoparticle, resulting in longer growth time. This invention would also allow the use of fluctuating and ramped magnetic field intensity and direction to affect faster growth and the inhibition of multiwalled nanotubes. This invention opens a new door in the field of material science.

The complete disclosures of all references cited in this specification are hereby incorporated by reference. In the event of an otherwise irreconcilable conflict, however, the present specification shall control.

What is claimed is:

1. A process for the production of carbon nanotubes; said process comprising:
    a) contacting catalytic nanoparticles with a hydrocarbon gas in a reaction zone, while holding the reaction zone at conditions suitable for the growth of carbon nanotubes, and applying an external magnetic field in order to grow carbon nanotubes,
    b) changing the direction of the magnetic field relative to the catalytic nanoparticles, and
    c) growing carbon nanotubes under magnetic fields of different directions as in step a).

2. A process for the production of carbon nanotubes according to claim 1, wherein the catalytic nanoparticles are located on a substrate.

3. A process for the production of carbon nanotubes according to claim 2, wherein the substrate is located on a sample holder in the reaction zone, and the step of changing the direction of the magnetic field is accomplished by rotating the sample holder.

4. A process for the production of carbon nanotubes; said process comprising:
    a) contacting catalytic nanoparticles with a hydrocarbon gas in a reaction zone, while holding the reaction zone at conditions suitable for the growth of carbon nanotubes, and applying an external magnetic field,
    b) changing the strength of the magnetic field during the growth of the carbon nanotubes.

5. A process for the production of carbon nanotubes; said process comprising:
    a) contacting catalytic nanoparticles with a hydrocarbon gas in a reaction zone, while holding the reaction zone at conditions suitable for the growth of carbon nanotubes, and applying an external magnetic field,
    b) changing the direction of the magnetic field during the growth of the carbon nanotubes.

* * * * *